US010397411B2

(12) United States Patent
Boyce

(10) Patent No.: US 10,397,411 B2
(45) Date of Patent: Aug. 27, 2019

(54) ACCESS NODE AND METHOD

(71) Applicant: Boyce Technologies Inc., Long Island City, NY (US)

(72) Inventor: Charles Boyce, New York, NY (US)

(73) Assignee: Boyce Technologies Inc., Long Island City, NY (US)

( * ) Notice: Subject to any disclaimer, the term of this patent is extended or adjusted under 35 U.S.C. 154(b) by 0 days.

(21) Appl. No.: 16/051,789

(22) Filed: Aug. 1, 2018

(65) Prior Publication Data

US 2018/0338048 A1 Nov. 22, 2018

Related U.S. Application Data

(62) Division of application No. 15/463,145, filed on Mar. 20, 2017, now Pat. No. 10,069,980, which is a (Continued)

(51) Int. Cl.
*H04M 1/18* (2006.01)
*H04M 19/00* (2006.01)
*G06F 1/18* (2006.01)
*H04M 1/74* (2006.01)
*G06F 1/20* (2006.01)
(Continued)

(52) U.S. Cl.
CPC .......... *H04M 19/001* (2013.01); *G06F 1/189* (2013.01); *G06F 1/206* (2013.01); *H04M 1/18* (2013.01); *H04M 1/745* (2013.01); *E04H 1/14* (2013.01); *G08B 1/00* (2013.01); *G08B 21/185* (2013.01); *H04M 11/04* (2013.01); *H04W 88/08* (2013.01)

(58) Field of Classification Search
CPC ...... H04M 1/18; H04M 11/04; H04M 19/001; H04M 1/745; G08B 1/00; G08B 21/185; E04H 1/14; G06F 1/189; G06F 1/206; H04W 88/08
USPC .......................... 361/728, 748, 817, 833, 835
See application file for complete search history.

(56) References Cited

U.S. PATENT DOCUMENTS 4,640,545 A * 2/1987 von Wimmersperg ...................... B60N 2/2824
292/DIG. 22
5,159,534 A * 10/1992 Hudson ................ H05K 7/1439
361/679.58
(Continued)

*Primary Examiner* — Tuan D Nguyen
(74) *Attorney, Agent, or Firm* — Schiff Hardin LLP

(57) ABSTRACT

An all-encompassing fully integrated communication Access Node for call stations and other security and communications equipment includes a modular housing within which is mounted wire and wireless communication systems and power systems. The housing has a chassis for mounting the electronics and battery modules and a backbox and panel for staged installations, managing cables and providing heat dissipation. A door to the chassis is secured using latch hooks with roller bearings. Optical cable termination is provided as a two sided patch panel. Dual power supplies provide power to internal components and to external components via a distribution module. Backup power is provided by a custom battery backup with a charging controller. Cooling is controlled by dual fans and a fan controller moving air through the housing using openings and baffles. Freestanding pedestal mounting of the Access Node and various other mounts for column, wall, or ceiling to any substrate or condition is an option. Venting through a plug prevents pressure build up.

16 Claims, 20 Drawing Sheets

Related U.S. Application Data division of application No. 14/968,761, filed on Dec. 14, 2015, now Pat. No. 9,641,659.

(60) Provisional application No. 62/091,196, filed on Dec. 12, 2014.

(51) Int. Cl.
| | |
|---|---|
| E04H 1/14 | (2006.01) |
| G08B 1/00 | (2006.01) |
| H04M 11/04 | (2006.01) |
| G08B 21/18 | (2006.01) |
| H04W 88/08 | (2009.01) |

(56) References Cited

U.S. PATENT DOCUMENTS

| | | | |
|---|---|---|---|
| 5,669,682 A * | 9/1997 | Janson | A47B 53/02 188/82.84 |
| 5,971,804 A | 10/1999 | Gallagher et al. | |
| 6,325,636 B1 * | 12/2001 | Hipp | G06F 1/183 361/788 |
| 6,411,506 B1 | 6/2002 | Hipp et al. | |
| 6,512,669 B1 * | 1/2003 | Goodwin | H02B 1/28 200/50.12 |
| 6,677,728 B2 | 1/2004 | Takedomi et al. | |
| 7,227,945 B2 | 6/2007 | Keppel et al. | |
| 7,733,054 B2 | 6/2010 | Phillips et al. | |
| 8,278,877 B2 | 10/2012 | Murayama et al. | |
| 8,345,845 B2 | 1/2013 | Boyce et al. | |
| 2004/0105219 A1 * | 6/2004 | McClellan | H04Q 1/068 361/600 |
| 2006/0248360 A1 | 11/2006 | Fung | |
| 2011/0133559 A1 | 6/2011 | Yamashita et al. | |
| 2013/0063073 A1 * | 3/2013 | Kawasaki | H02J 7/0027 320/101 |
| 2013/0082659 A1 | 4/2013 | Kano | |
| 2014/0195859 A1 | 7/2014 | Dickenson et al. | |
| 2015/0222131 A1 | 8/2015 | Kano | |

* cited by examiner

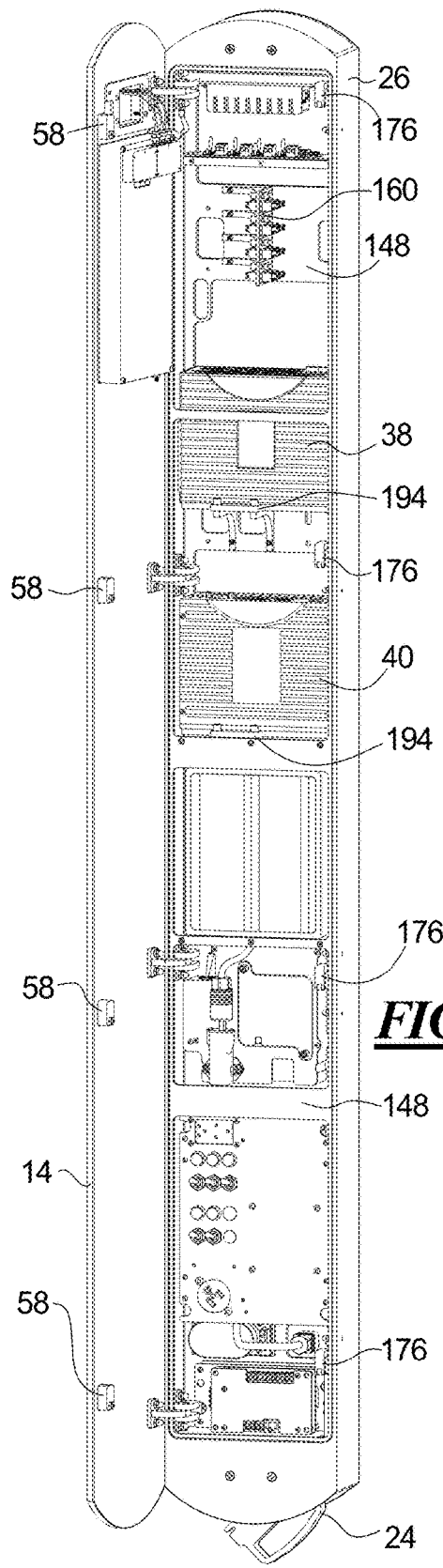
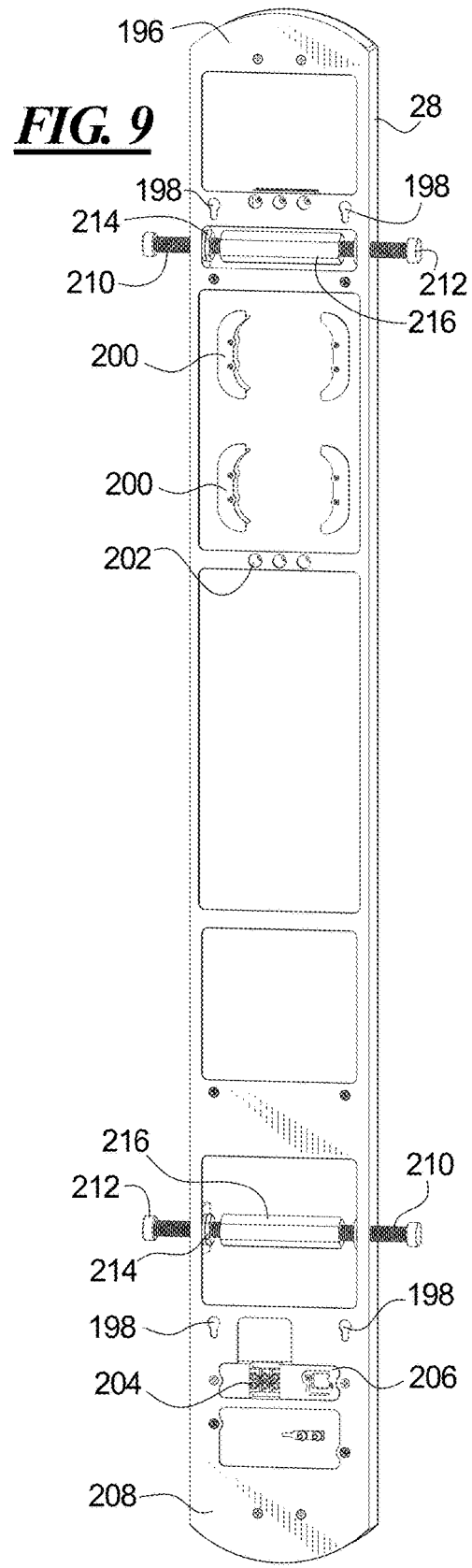
FIG. 8
FIG. 9

Constant Voltage / Constant Current Charging Method

LI Battery Pack Charge System Block Diagram

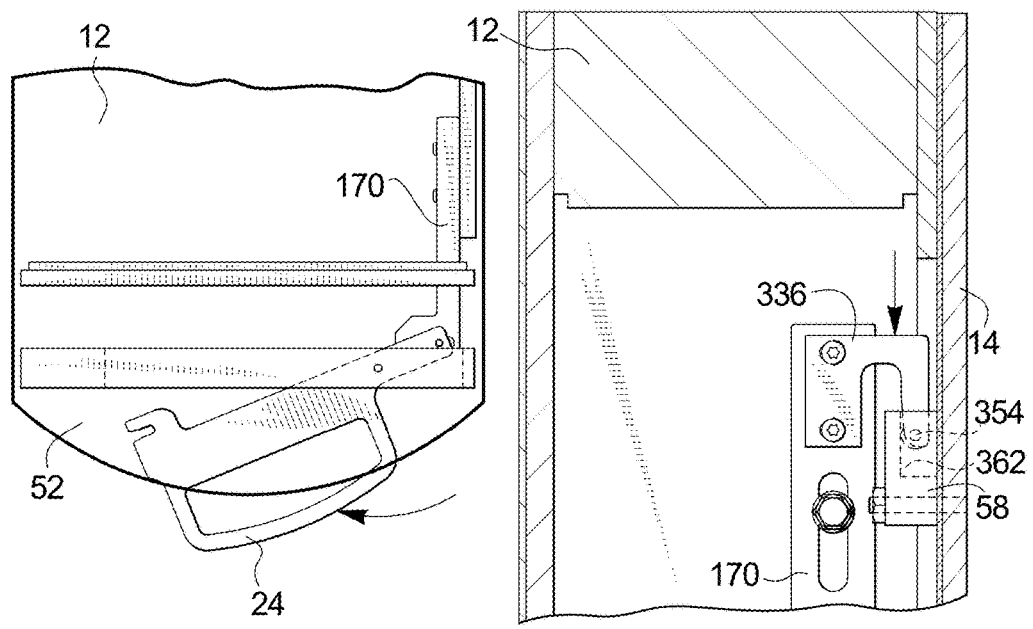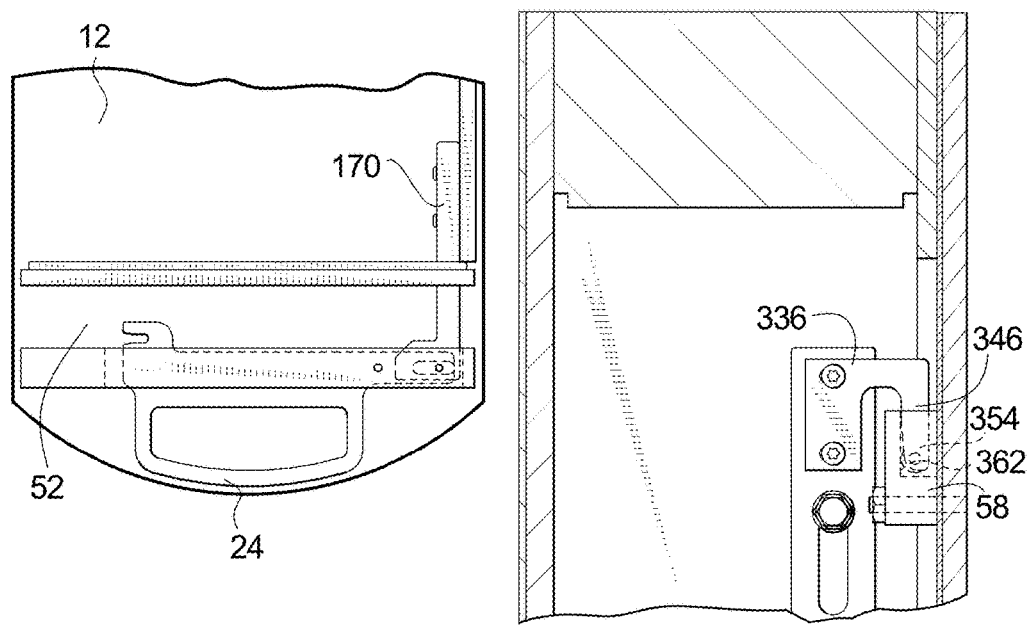

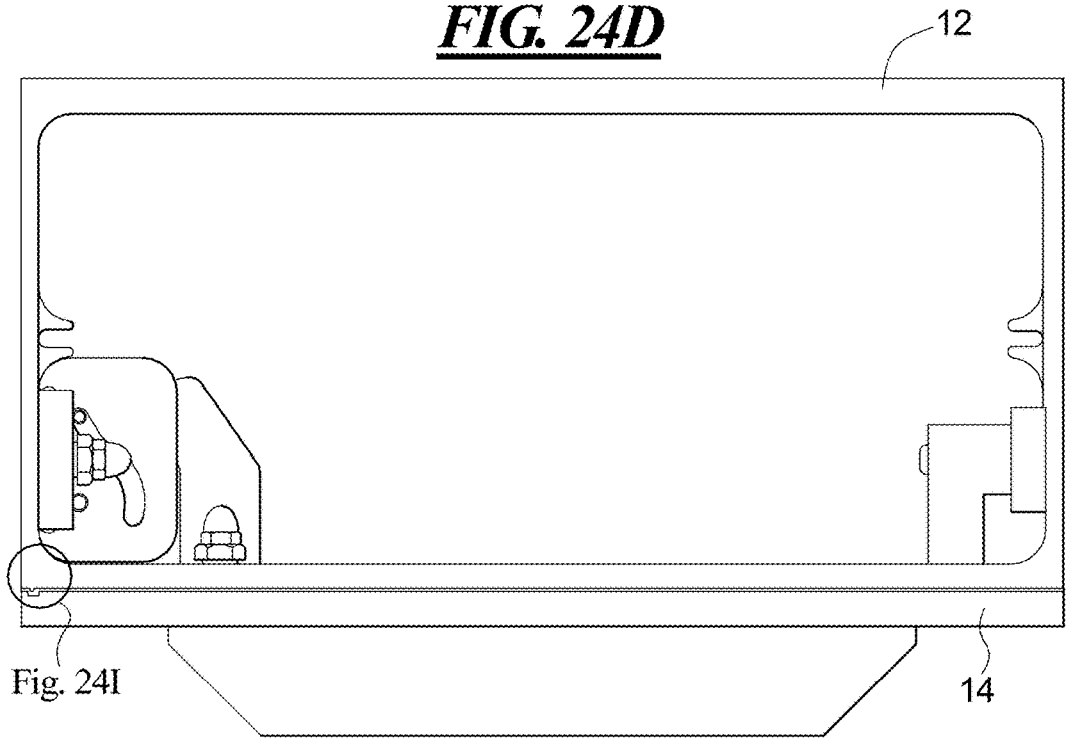
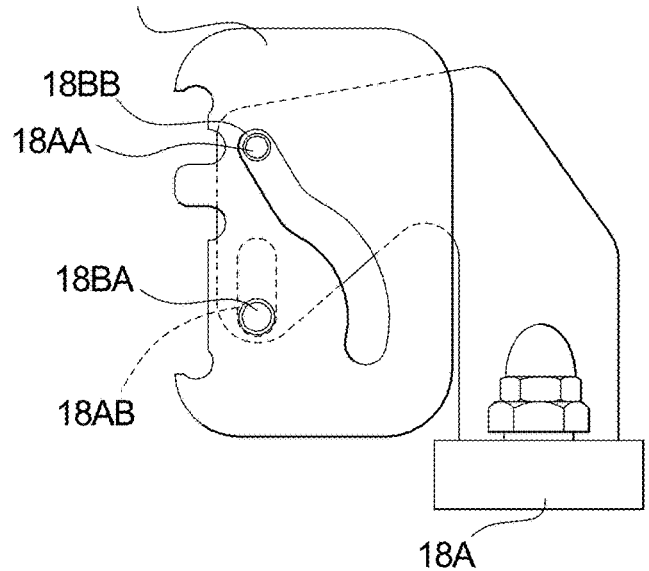
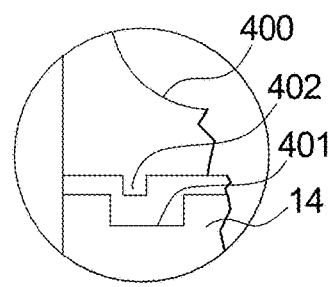

ACCESS NODE AND METHOD

CROSS-REFERENCE TO RELATED APPLICATION

This application is a divisional patent application of co-pending U.S. patent application Ser. No. 15/463,145, filed Mar. 20, 2017, which is incorporated herein by reference.

U.S. patent application Ser. No. 15/463,145 is a divisional patent application of U.S. patent application Ser. No. 14/968,761, filed Dec. 14, 2015, which is incorporated herein by reference.

This application claims the benefit of U.S. Provisional Patent Application Ser. No. 62/091,196, filed Dec. 12, 2014, which is incorporated herein by reference.

BACKGROUND OF THE INVENTION

Field of the Invention

The present invention relates generally to a communication device or Access Node for a public communication system and more particularly to a communication Access Node for use in a public transportation facility or other location.

Description of the Related Art

People in public transportation facilities, such as train stations, subway stations, and bus stations, may need assistance or information. For example, people in public transportation facilities may need assistance if they become a victim of a crime or if they feel threatened with a possible crime. People in the public transportation facility may need information, such as time to next train, subway or bus arrival, time of last train for the evening, directions, etc. To address this need, operators of public transportation facilities are providing call stations at locations within facilities. Commonly, several call stations are provided within a transportation facility. The call stations generally include a call button for indicating an emergency and may include an information request button for requesting information.

The call stations may be connected through communication equipment mounted in a column, wall, and ceiling or otherwise near the call stations to provide communication to a communication center or to provide contact to an emergency service or information source. The communication equipment may communicate with a plurality of the call stations or other security devices. For example, the communication equipment may communicate with all of the call stations within a subway station, for example, linking the call stations to the communication center.

Call stations may be provided at other locations as well. For example, call stations may be provided on college campuses, in parking garages or parking lots, at tourist attractions, or in any location where desired.

SUMMARY OF THE INVENTION

A communication device, also referred to as an Access Node, provides a single housing for communication equipment that links a plurality of call stations and other security based equipment to a communication center or other communication destination. The housing may enclose wired and wireless network communication devices, a power supply, a backup power supply, cable connectors and patch panels, a cooling system, sensors, and/or other equipment. The housing is easily mounted to a variety of mounting surfaces at a location that permits ready access for servicing and upgrades. The housing provides a NEMA 4 sealed and secure enclosure for the communication equipment. The housing is durable and reduces the chance of unauthorized access to the enclosed equipment.

The Access Node has a modular construction so that it may be configured to meet the demands of each installation. The installation of a single Access Node provides all of the necessary equipment needed for communication with a plurality of call stations and security devices. The equipment within the housing is readily accessible by service personnel for ease of servicing and upgrading. The Access Node includes the equipment within the housing which may be configured as needed to accommodate various data and power needs.

BRIEF DESCRIPTION OF THE DRAWINGS

FIG. 8 is a front view of the Access Node with the door in an open position;

FIG. 9 is a perspective view of back panel for the Access Node of FIG. 8;

FIG. 22 is a fragmentary cross sectional view showing the latch hook in a partially latched position;

FIG. 23 is a fragmentary cross sectional view showing the latch hook in a fully latched position;

FIG. 24D is a cross-sectional view of the access node showing the door in a fourth or closed position during opening and closing of door 14 on the housing 12 and FIG. 24H is an enlarged view of the hinge in the fourth or closed position; and FIG. 24I is an enlarged cross-sectional view of a portion of FIG. 24D showing a gasket construction in the fourth or closed position.

DETAILED DESCRIPTION OF THE PREFERRED EMBODIMENTS

Figure 1:
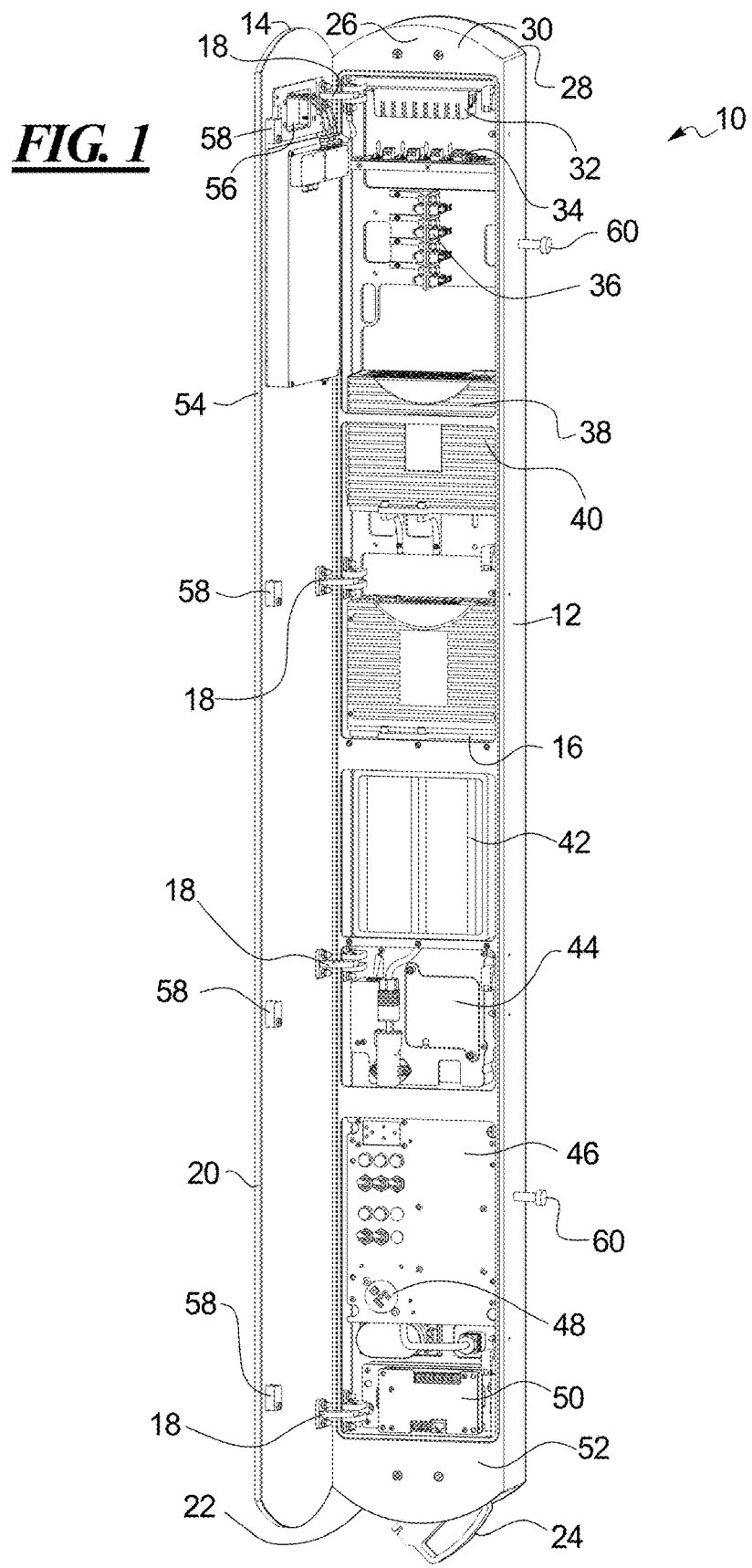
FIG. 1 is a front elevational view of a communication device or Access Node according to an embodiment of the invention.

FIG. 1 shows a communication device or Access Node 10. The Access Node 10 provides a single housing for communication equipment that links a plurality of call stations and other security based equipment to a communication center or other communication destination in a public transportation facility or other location. The single enclosure provides ease of installation and maintenance for the network communication equipment. The Access Node provides the network communications infrastructure for call stations as well as other Ethernet safety and security communications equipment like cameras, air purity detectors, proximity detectors, RF identification and other wireless applications designed to track individuals. The 100 meter distance limitation of Ethernet often prevents the distribution of such devices within a Transit environment. The Access Node, being fiber fed provides basically distance limitless optical transmission at very high digital speeds to a core network. The Access Node 10 includes a housing 12 and a door 14. The housing 12 and the door 14 enclose an interior space 16 when the door 14 is closed. When the door 14 is closed and locked, access to the interior space 16 is generally prevented except by authorized persons. Within the interior space 16 is provided mounting structures for mounting equipment including network and communications equipment as needed. Depending on the needs of a particular installation, the interior space 16 may be provided with wired and wireless network switch devices, PC based application server and drive storage arrays, power supplies, connectors and patch panels, cooling fans and thermal management systems, power distribution and regulation, cable mounting and routing, backup power supply, intrusion protection and detection, temperature and humidity monitoring, structures for mounting to various mounting surfaces; and other features. The housing 12 may be thought of as a hotel in which equipment and systems needed for each installation can be located.

The housing 12 and door 14 together form an enclosure having a generally columnar shape. The enclosure of certain embodiments has no visible external fasteners when in a closed and locked position. Vandalism and theft are thereby discouraged. The columnar housing 12 is similar in shape and size to call stations that may be provided in many public transportation facilities, and may be provided with similar aesthetic features as the call stations.

Figure 2:
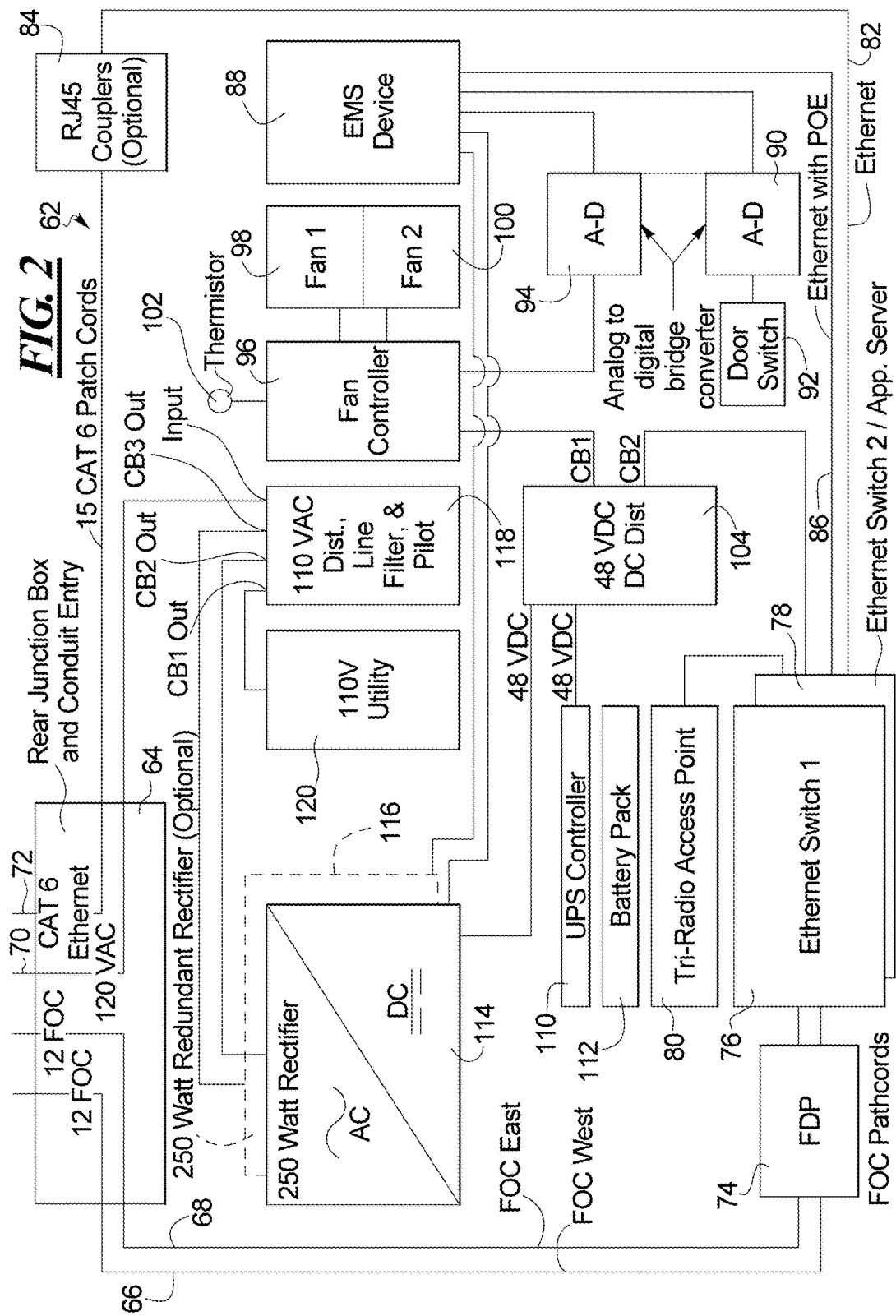
FIG. 2 is a functional block diagram of an embodiment of the communication device or Access Node.

As shown in detail in FIGS. 24A-24I, the door 14 is connected to the housing 12 by a concealed hinge assembly 18 that is configured to be entirely enclosed within the housing when the door is in the closed position. The hinge assembly 18 provides two-motion operation, first pivoting toward a closed position and then moving in a translational motion as a second motion to engage the door 14 against the housing 12. The hinge 18 comprises a rotating hinge 18A and a stationary hinge 18B. The stationary hinge 18B has a stationary pin 18BA and a slot 18BB. The rotating hinge 18A has a pin 18AA and a slot 18AB. The slot 18AB of the rotating hinge 18A is constrained to the stationary pin 18BA of the stationary hinge 18b. The rotating hinge's pin 18AA is constrained to the slot 18BB of the stationary hinge 18B and travels in a linear portion of the slot 18BB of the stationary hinge 18B upon closing the door 14. By constraining the rotating hinge's pin 18AA to the linear portion of the slot 18BB on the stationary hinge 18B, along with constraining the slot 18AB of the rotating hinge 18A to the fixed or stationary pin 18BA of the stationary hinge 18B, an arching motion that is smooth and controlled, and a sealing results on the hinged side of the door and enclosure. In addition to sealing the hinged side of the enclosure, the door cannot be slammed shut, unlike doors with typical hinges containing a single pivot point. This ensures that the door 14 is fully sealed against the housing 12. The two-motion operation of the door 14 during opening operation permits the door to move to its open position out of the way when access to the interior is required. Four hinge assemblies 18 are provided in the illustrated embodiment. A gasket 20 or other liquid tight seal is provided between the door 14 and the housing 12. In certain examples, the gasket 20 is mounted on the door 14 in a position so that it is compressed between the door 14 and housing 12 following the second motion of the hinge 18. The door 14 and gasket 20 are also shown in FIGS. 24A-24I with the door in the open and closed position where the full sealing is provided for. In FIG. 2 the gasket 20 detail is shown. With the last 10° of rotation, the face of the door is forced by the dual action of the hinge towards the chassis to form a water tight seal. In the gasket detail the chassis 400 is shown, the door 14 is shown, a mortise 401 is shown, and a tenon at 402 is shown. A lip on a perimeter of the enclosure creates two continuous sealing points between gasket and enclosure. The gasket detail in step 4 shows the gasket compressed and sealed in the closed position.

The housing 12 may be locked and/or unlocked by an electronic programmed key that fits into a key hole 22 at a lower end of the housing 12. The electronic key permits opening of the door only by a key that includes a predetermined encrypted key code that binds the key to that device. The access by the electronic key is logged in an access logging system in the Access Node 10 to provide an audit trail of accesses and/or access attempts to the housing 12. Once the electronic lock is unlocked, a latch handle 24 may be pivoted to an open position as shown. When the handle 24 is in a closed position, the handle is located within a recess in the underside of the housing 12. As the latch handle 24 is moved between the open and closed positions, the handle movement moves a slider bar within the housing 12 to latch and unlatch the door locks. More information on the door locks will be provided hereinafter.

The housing 12 is of a modular construction to permit modification of the housing and the interior space 16 to meet the needs of each installation and to permit servicing and upgrading of the Access Node 104 to add or remove call stations, or to permit upgrading or replacing of equipment. The fasteners used to mount the equipment and to assemble the modular components are all of a same type so that a service person may use a single tool to remove and replace each of the modular components within the housing. In one example, a number 1 Phillips screwdriver may be used to remove and install all of the components within the housing.

In the illustrated example, the housing 12 is formed of a front chassis 26 and a rear panel or back box 28, which will be described in more detail. The housing 12 has been equipped with the following features and equipment for an example of an installation, a solid end cap 30, an environmental sensor 32, an auxiliary power distribution module 34, a cable patch panel 36, a first Ethernet switch 38 (or an application server/embedded PC), a second Ethernet switch 40, a battery pack 42 (which may preferably comprise an AGM battery, a lithium battery, or other suitable battery), a UPS (uninterruptable power supply) module 44 (a first swapable charging personality module), a power module 46, a convenience electrical outlet 48, a fan module 50, and a bottom end cap 52. On the door 14 is provided a wireless radio access point module 54 that is connected to the housing by a cable 56 that extends from the housing 12 to the door 14 near the topmost hinge 18 in this illustration. The modular components can be installed, removed or replaced as needed. Also on the door 14 are provided four pockets 58 that are engaged by latch hooks, as will be described.

The housing 12 is constructed so that it may be mounted using numerous mounting options. The housing 12 may be mounted to columns including to round, square or other shapes of columns, on or within the recesses of I-beam columns, on walls, fences, grates, or other mounting locations. In certain embodiments, a free standing pedestal mount is provided, as will be described. The housing 12 may be mounted and operated either in a vertical orientation as shown or in a horizontal configuration. In the illustrated embodiment, the rear panel 28 is provided with expandable column gripper assemblies 60 for mounting the Access Node 10 within a recess of an I-beam, for example. Embedded and threaded conduit threaded connectors are provided on the top and bottom of the rear panel 28 for external connection of wires and cables.

The modular construction of the Access Node 10 permits a phased-in installation of the device. The Access Node 10 and one or a few call stations may be installed in a location at first. As call stations are added, communications and network equipment may be added and upgraded in the Access Node 10 to accommodate the growth. Phased installation is possible without requiring that the Access Node 10 be replaced with a different Access Node at each phase to add capacity, for example. It is also not necessary that an Access Node 10 be provided with all the equipment that it will ultimately be need for an installation site, even if that equipment will not yet be used in the initial installation, since the Access Node may be readily upgraded in the future.

In the an example, the Access Node is provided with a 500 watt power supply, NEMA 4 designed chassis and input/output connectors, an electronically controlled access lock, Ethernet managed and hardened switch, integrated wireless licensed and unlicensed MESH tri radio access point, 2.4 GHz quad core Pentium processor server with 4 TB hard disk storage, AC power distribution with indication and main circuit protection, DC power generation and distribution with indication and circuit protection, integrated UPS power control module and lithium ion battery pack, a multipoint door latching system, an 8-point ST, 16-port LC or 8 port SC fiber distribution panel, a fiber management and clamping system, a quick connect AC power system, an internal AC line filtering and transient protection system, AC utility convenience outlet, dual PWM fans with thermal feedback speed control, and intrusion, temperature, humidity, dew, and fan detection. SNMP (system network management protocol) monitoring is provided.

In an example, the housing 12 has a chassis 26 with dimensions of 64.12 inches by 7.5 inches by 4 inches, not including an antenna radome. A back box or rear panel 28 has dimensions of 64.12 inches by 7.5 inches by 1.75 inches. The operating voltage is 90 to 264 VAC, autoranging input. The operating power consumption is a maximum of ~100 watts for internal components. Maximum power consumption PoE (power over Ethernet) is 310 watts under full load while running 16 ports on 802.3af. The switching power capacity of the exemplary unit is 16 ports. 802.3at PoE is possible and limited by firmware to the maximum available power delivered by the power system. It is envisioned that one port is used for environmental purposes, one port is used for the UPS, and one is used for the access point. The wireless operation complies with FCC standards.

An example Access Node is constructed to operate in environments ranging from −20 to +60 degrees C. The device is configured to operate at up to 95% humidity, non-condensing. The chassis weight has a weight of approximately 70 pounds, depending on the configuration.

The housing 12 and door 14 may be of extruded and then machined metal to provide a rugged chassis and enclosure. The housing 12 and door 14 are constructed to withstand the harsh and unpredictable environment of public transportation facilities. The materials used include anodized aluminum, powder coated aluminum, stainless steel, Poron, neoprene, silicone, stainless steel, fiberglass and UHMW-PE.

FIG. 2 is a block diagram of the Access Node 10 as shown in a one-line diagram 62. At the upper left is provided a rear junction box and conduit entry block 64. The entry block 64 carries two 12 FOC (fiber optic cable) lines 66 and 68, a 120 VAC line 70, and a CAT 6 Ethernet line 72. The 12 FOC lines are marked as FOC east 68 and FOC west 66 and connect to an FDP (fiber distribution panel) block 74 that is indicated as FOC patch chords. The FDP block 74 connects to a first Ethernet switch 76 and a second Ethernet switch 78. The switches 76 and 78 connect to a wireless access point block 80, here a tri-radio (Motorola AP7161) wireless access point. The switches 76 and 78 have an output Ethernet line 82 connected to a RJ45 coupler 84 (which is optional). Another output line 86 is an Ethernet with POE (power of Ethernet) that connects to an environmental monitoring sensor (EMS) device 15 block 88.

Block 88 includes an environmental monitoring system. In certain embodiments, the EMS device 88 detects opening of the door and any cabinet intrusion. It also monitors temperature and humidity sensors, monitors the fan operation, and monitors the power supply condition. The EMS device 88 reports the monitored conditions via SNMP to an Ethernet switch.

The EMS device block 88 connects to a first Analog to Digital (A-D) block 90 that is connected to a door switch 92. The A-D block 90 includes an analog to digital bridge converter for analog to digital conversion and EMF blocking. The EMS device block 88 also connects to a second A-D 94 that in turn is connected to a fan controller 96. The fan controller 96 connects to a first fan 98 and second fan 100. The fan controller 96 controls the fans 98 and 100 depending on a signal from a thermistor 102. The fan controller 96 is supplied with power from a DC distributor 104, which here is a 48 volt DC distributor, via line CB1, part number 106.

The voltage distributor 104 also provides power to the switches or application server 76 and 78 via line CB2, part number 108. The voltage distributor 104 has a 48 volt DC line that is connected to a UPS controller 110 that in turn is connected to a battery pack 112. The voltage distributor 104 receives its power from an AC to DC converter 114 that includes a 250 watt rectifier. The converter 114 may optionally include a redundant 250 watt rectifier or converter 116, as indicated in broken lines. The rectifier or converter 114 receives it power from a 110 volt AC distribution, line filter and pilot block 118. The AC distributor 118 has one output, labeled CB1, connected to a 110 volt utility output 120, a second output CB2 to the converter 114 and a third output CB3 optionally connected to the redundant converter 116. The input of the AC distributor 118 has an input connected to line 70 through the rear junction box 64 via which it receives the 120 volt AC power. The remaining line 72 through the junction box includes up to 15 CAT 6 patch cords that are fed by the Ethernet switches 76 or 78.

Figure 3:
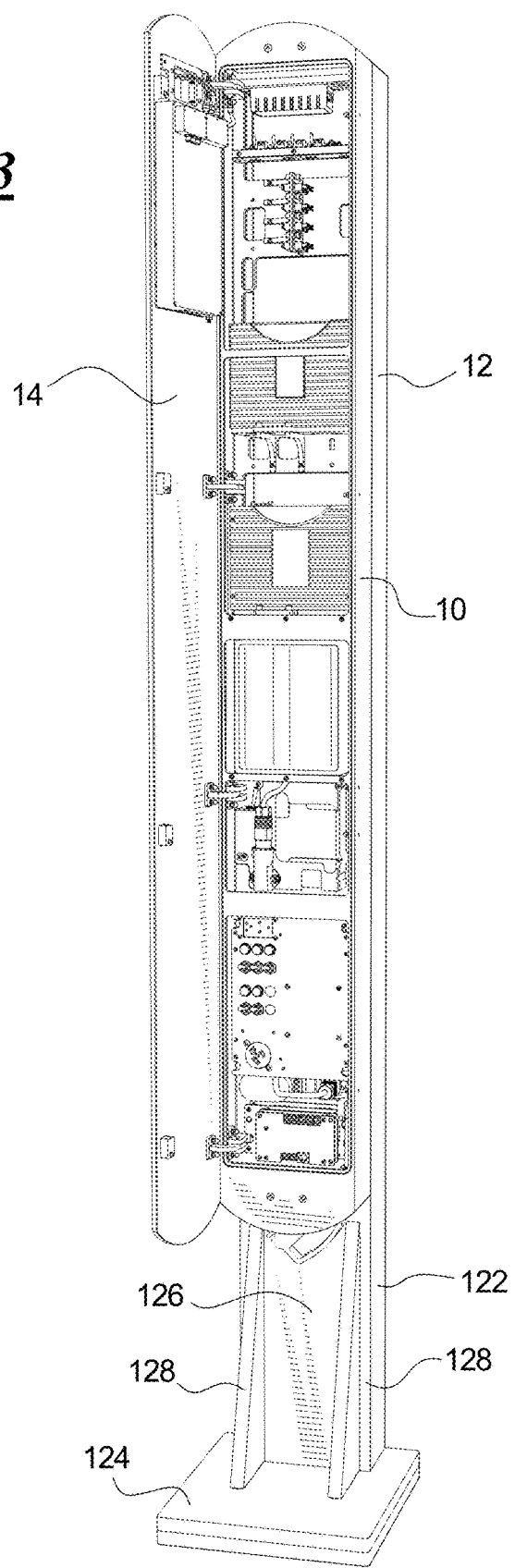
FIG. 3 is a front perspective view of an embodiment of the Access Node mounted on a pedestal mount.

In FIG. 3 is shown a pedestal mounted Access Node 10. A pedestal 122 may be mounted on a floor or platform surface and may be freestanding without the need to be mounted to a column, wall, ceiling, grate, fence or other vertical surface. The pedestal 122 has a base plate 124 from which extend a vertical plate 126. Two gussets 128 provide reinforcing support between the vertical plate 126 and the Access Node housing 12. The door 14 of the Access Node 10 is shown in the open condition. In certain embodiments, the vertical plate 126 forms the rear panel or back box 28 of the Access Node 10. In particular, a different rear panel or back box 28 may be provided for a pedestal mounted Access Node 10 than for a wall or column mounted Access Node. The back box 28 may be specific to the mounting location and configured as need. In the illustration, the back box 28 goes to the base of the pedestal mount. Wall or column mounted Access Nodes may use shorter back boxes.

Figure 4:
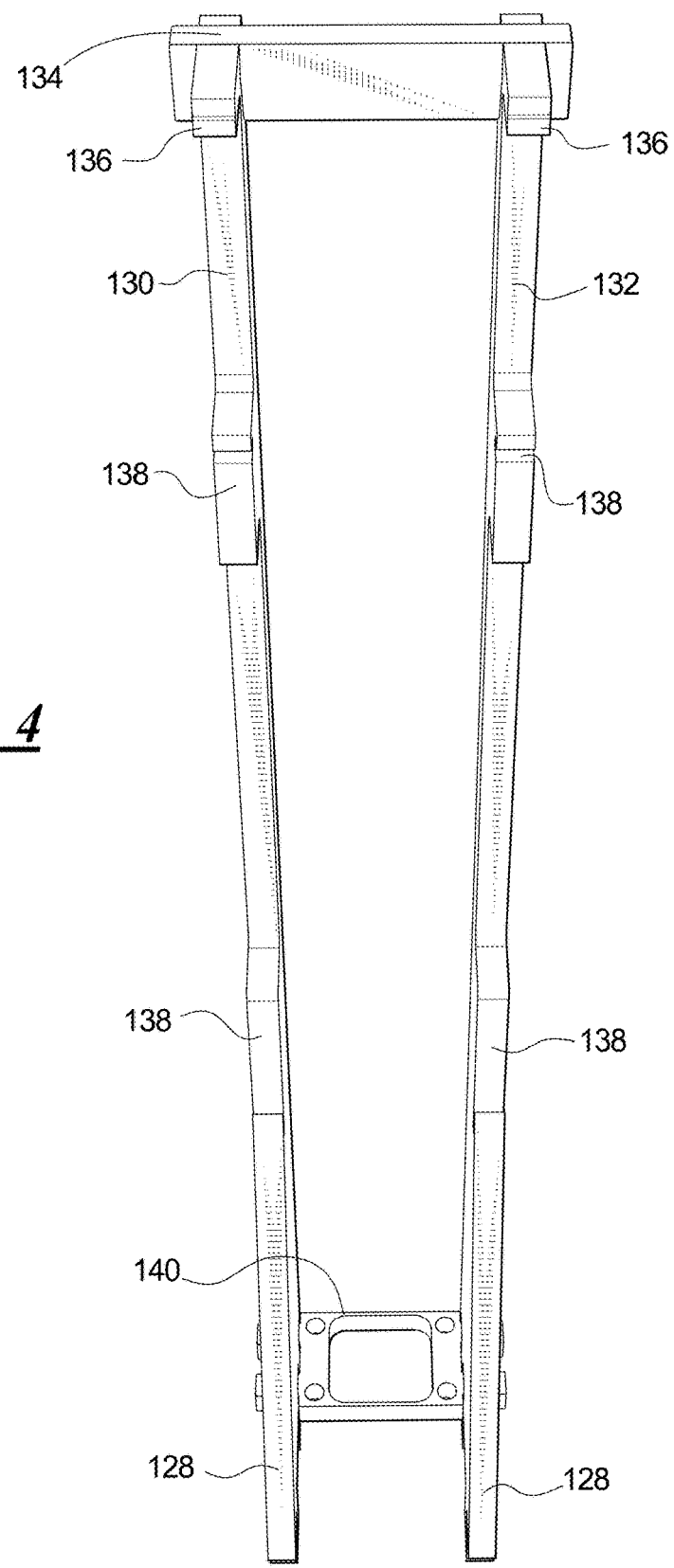
FIG. 4 is a front perspective view of an embodiment of an upper frame of the pedestal mount.

FIG. 4 shows components of the pedestal 122. Two vertical beams 130 and 132 are connected by an upper linking support 134. Forward extending mounting projections 136 and pedestal gussets 138 are provided on the beams 130 and 132 on which the rear panel 26 may be mounted. A shelf portion 140 is provided between the beams 130 and 132 and the lower gussets 128.

Figure 5:
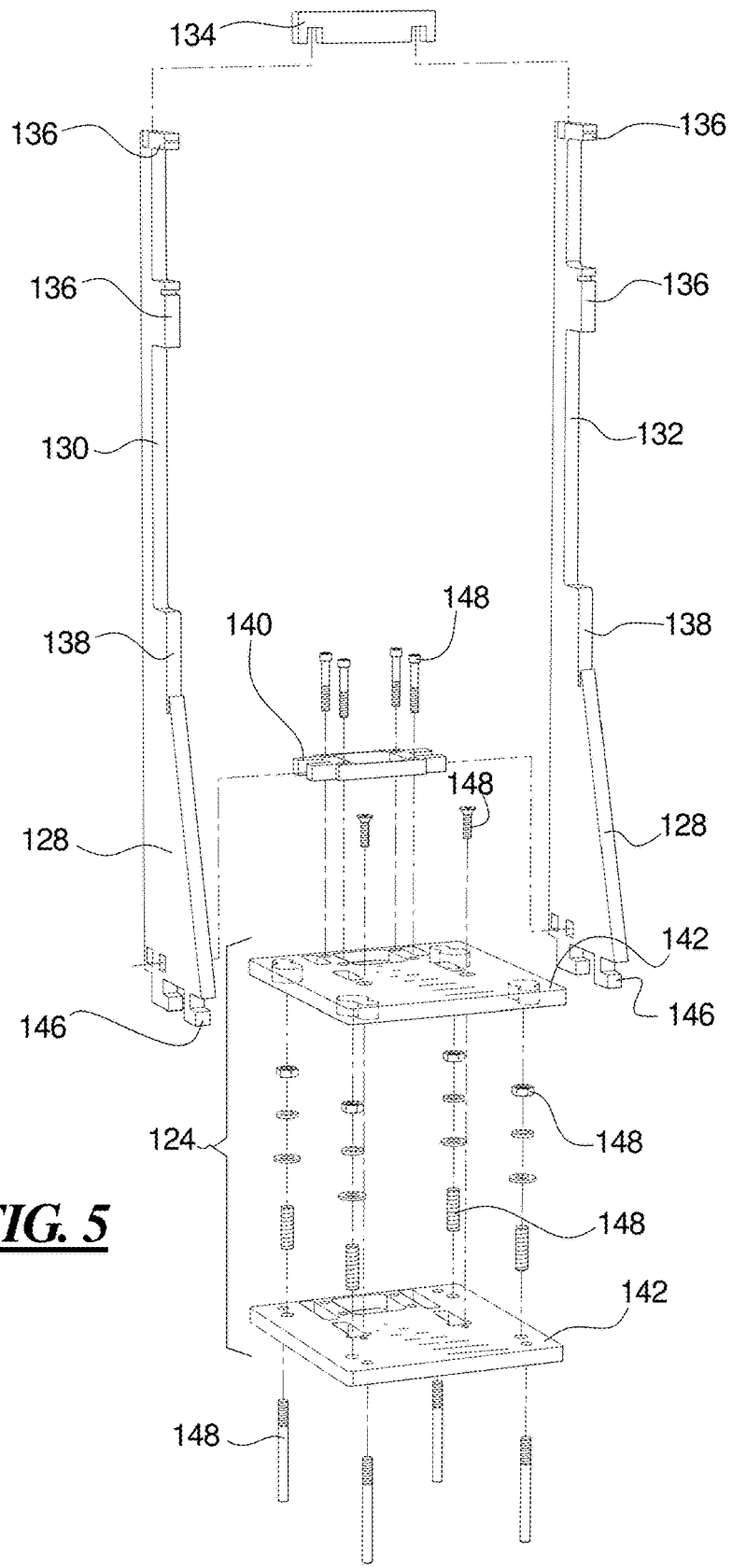
FIG. 5 is an exploded view of an embodiment of a lower portion of the pedestal mount.

FIG. 5 shows the components of the pedestal 122 according to a certain embodiment. The pedestal includes the upper linking support 134 connecting the vertical beams 130 and 132. The beams 130 and 132 are integrally formed with the projections 136, pedestal gussets 138 and the gussets 128. The base 124 includes a lower base member 142 that may be fastened to floor or platform and an upper base member 144 that is fastened to the lower base member 142. Hooks 146 on the lower end of the beams 130 and 132 engage into the upper base member 144 and are secured by the shelf portion 140. Various screws bolts, nuts, and washers 148 are provided to hold the parts together.

Figure 6:
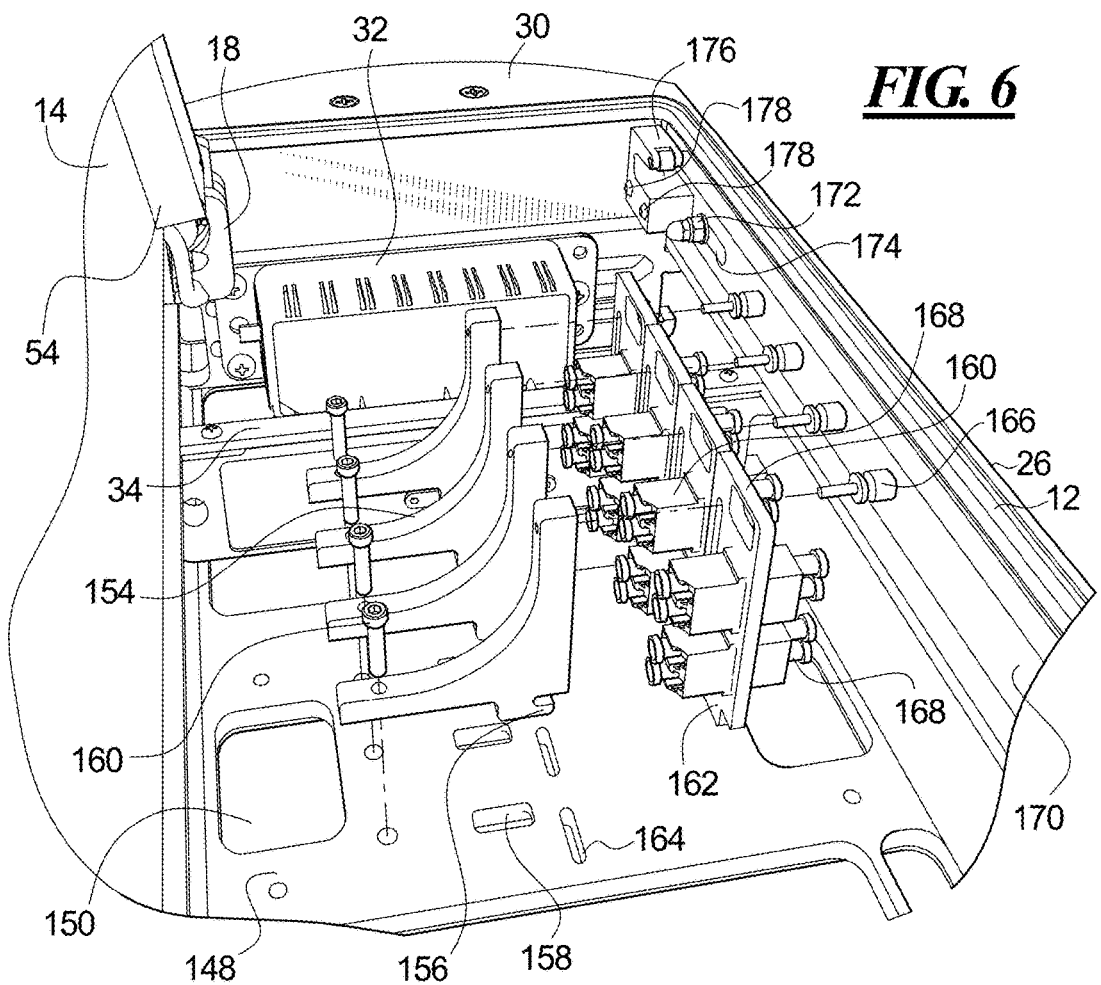
FIG. 6 is a front perspective view of an optical cable terminator patch panel as may be used in the Access Node.

FIG. 6 shows the front chassis 26 from which the rear panel or back box 28 has been removed. The solid end cap 30 is provided at the end of the chassis 26. A portion of the wireless access module 54 mounted on the door 14 is visible in the open position with a single hinge 18 in this view. Within the chassis 26 is mounted the environmental sensor 32 and the power distribution module 34. The chassis 26 includes a perforate wall 148 within the chassis 26 on which may be mounted various equipment. The perforate wall 148 includes openings 150 through which may be passed cables and wires and through which may flow air for cooling of the equipment in the Access Node 10.

The chassis 26 of the illustrated embodiment includes a fiber optic cable (FOC) management system 152. The cable management system 152 is modular and may be configured for the capacity needed and may be upgraded as additional capacity is needed. In the illustration, four angle members 154 are each connected to the perforate wall 148 by a hook 156 that is inserted into a slot 158 in the perforate wall 148 and slid parallel to the wall 148 to engage the hook 156 in the slot 158. Each angle member 154 is secured by a screw 160 through the angle member 154 and into the perforate wall 148. As few or as many angle members as needed may be installed.

To each installed angle member 154 may be attached a low profile duplex LC patch panel 160. Each patch panel 160 has a lower tab 162 that is inserted into a slot 164 in the perforate wall 148. A screw 166 is fastened through the patch panel 160 and into the corresponding angle member 154. As few or as many patch panels 160 may be installed as needed. Each of the patch panels 160 includes two duplex fiber terminators 168. One duplex fiber terminator 168 is provided on each side of each patch panel 160. In the illustrated embodiment, up to sixteen optical fiber cables may be connected to the patch panels 160 at the sixteen fiber terminators of the low profile panel.

Fiber breakouts provide openings 150 through the chassis 26 to permit routing of the cables and wires on the back side of the chassis and to the terminators 168 on the front side of the chassis 26. Cable and Velcro strips are provided to permit organizing of the fiber tails.

Also visible in FIG. 6 are portions of the door latching mechanism. In particular, along a side of the housing 12 is a sliding strip 170. The sliding strip 170 moves as the handle 24 at the bottom of the housing is moved. The sliding strip 170 is held in place by a fastener 172 that extends through a slot 174 in the strip 170 and into the housing 12. The slot 174 permits longitudinal movement of the strip 170. On the strip 170 is mounted a plurality of latch hooks 176, one of which is shown in this figure. The latch hook 176 is mounted so as to be adjustable to accommodate variations in the housing 12 and door 14 to thereby insure that the door is secured in a closed and sealed position. The latch hook 176 is shaped to engage a corresponding pocket 58 on the door 14. The latch hook 176 is mounted on two threaded studs 178 that extend from the sliding strip 170 in a direction parallel to the closed door 14.

Figure 7:
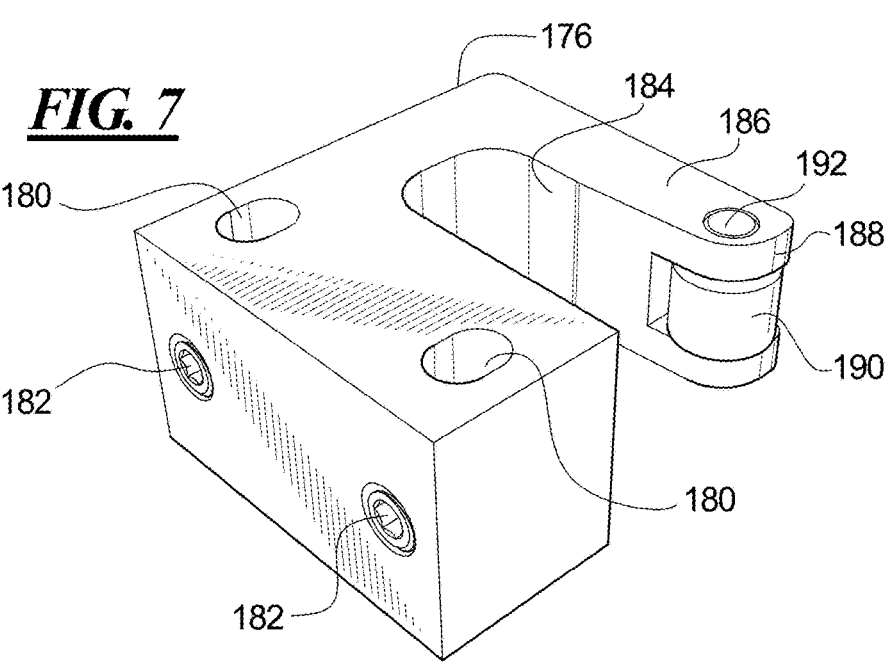
FIG. 7 is an enlarged perspective view of a latch hook as may be used in the Access Node.

Turning to FIG. 7, the latch hook 176 is a machined block of material, such as metal, that is configured to secure the door 14 in a closed and locked position on the housing 12. The latch hook 176 has two openings 180 that fit onto the screw studs 178 on the sliding strip 170. The latch hook 176 is adjusted on the screws studs 178 by set screws 182 to adjust the angle of engagement so as to therefore affect the amount of vertical influence on the door and finally the seal. The mounting screw studs 178 may be kept loose when first fastening the door closed so that the latch hooks can be adjusted by the setscrews by inserting a tool from behind the Access Node chassis using specially located access ports. Once the latch hook 176 moves into a position on screw studs 178 then the screw studs 178 are tightened final torque to engage the corresponding pocket 58. The set screws 182 have then 'jacked' and the screw studs may then be tightened to hold the latch hook 176 in the final adjusted position.

The latch hook 176 defines a channel 184 into which a wall of the pocket 58 fits when the latch is engaged. The channel 184 forms a hook portion 186 that fits into the pocket 58 during engagement. The channel 184 is tapered from a wider opening to a narrower throat so that the pocket 58 is engaged more securely as the latch hook moves to the fully engaged position. The wall of the pocket 58 encompasses bearings that bear against the throat of the channel 184 in the fully engaged position. To assist in initial engagement of the latch hook 176 on the pocket 58, the end 188 of the hook portion 186 is provided with a roller bearing 190 mounted on a pin 192. As the door latch is being engaged, if the end 188 of any of the latch hooks 176 strike the pockets 58, the roller bearing 190 permits the end 188 to move on the pocket 58 so that the latch hooks 176 move into the engaged position. The pockets 58 may be U-shaped member projecting from the inside surface of the door 14 and shaped so that the hook portion 186 may fit into the pocket 58.

As the latch handle 24 is pivoted to the closed position, the sliding strip 170 slides in the housing 12 and the latch hooks 176 are each moved into a latching position with the pockets 58 on the door 14. In the illustrated example, four latch hooks 176 engage four pockets 58 that are spaced along the length of the door 14 so that the door 14 is held in a closed and sealed position.

The leading edge of the door assembly is equipped with the latch pockets 58. The latch pockets 58 are set into a milled boundary of the door 14 to ensure that they are properly indexed by jacking setscrews and secured with two screws. Once the door 14 is shut, the latch pockets 58 interact with the latches 176. The roller bearing 19 grabs the pocket 58 as the chassis latch handle 24 at the bottom of the housing 12 is moved to a lock position. As the latch 176 engages within the pocket 58 it is forced tight by the taper inside the slot 184. Upon full extension of the latch handle 24, the pocket 58 bears with full pressure on the throat of the latch 176. This alleviates undue pressure on the tip of the roller bearing 190. The latches 176 attach to the slider strip 170 that interconnects to the Access Node lower handle 24. The latch 176 is adjustable to accommodate imperfections that that might be present in the chassis 26. The action draws a tenon rib milled around the circumference of the chassis into a mortise grooved around the circumference into the door, with a neoprene gasket between them, thus creating a watertight seal.

Figure 20:
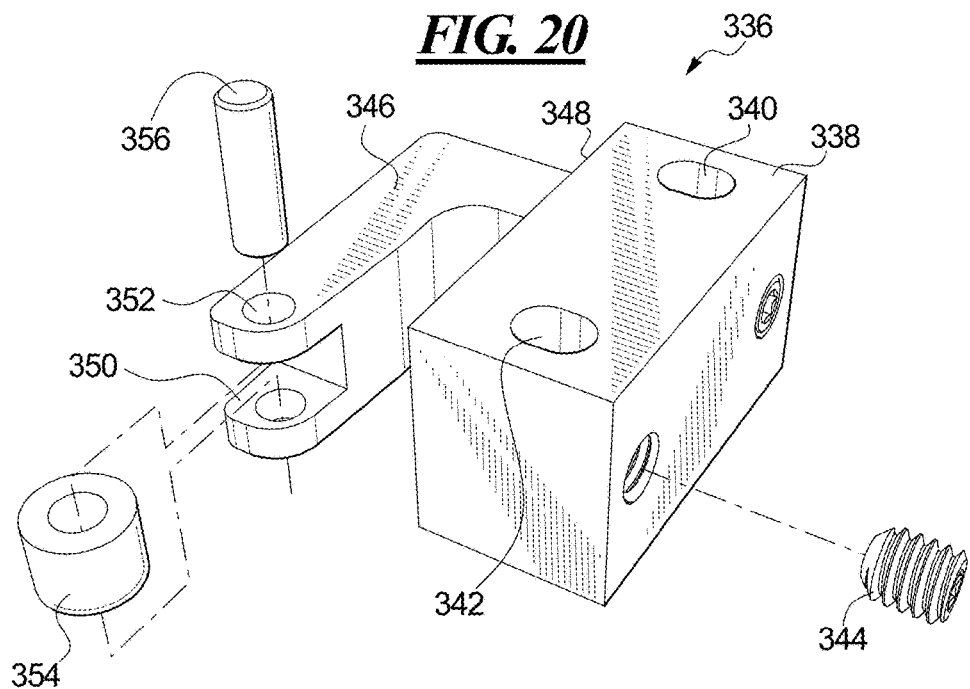
FIG. 20 is an exploded isometric view of an alternative embodiment of the latch hook.

An alternative embodiment of the latch hook is shown in FIG. 20.

FIGS. 8 and 9 show the chassis 26 separated from the rear panel or back box 28. The controls and connectors and other maintenance and repair structures are mounted for access at the front of the chassis 26 via the door 14, generally on the forward side of the perforate wall 148. The latch hooks 176 may be seen along the left side of the front opening, and the pocket 58 may be seen at corresponding positions on the door 14. Wiring, cabling and the like extends behind the perforate wall 148 in a space between the perforate wall 148 of the chassis 26 and the back box or rear panel 28. The perforate wall 148 may be provided with mounting brackets 194 on which are mounted the network switches 38 and 40. Other mounting brackets for other equipment may be provided on the perforate wall 148 or elsewhere within the housing 12.

The back box or rear panel 28 is shown in FIG. 9. The rear panel 28 may be fastened to the chassis 26 to enclose the back of the chassis 26. The rear panel 28 has a top end cap 196 that includes a conduit entry by which cabling may be brought into the Access Node 10. Keyhole openings 198 are provided at four positions in the rear panel 28 to engage with mating male studs for temporarily hanging the unit prior to mounting the rear panel, as an installation convenience, to the chassis 26. Ultimately, eight shoulder type screws are used to draw the front chassis to the rear, with gasket between, for a watertight seal. Fiber optic cable clamps 200 are provided on the rear panel 28 for holding optical cable that may be terminated at the patch panel 160 in the chassis 26. An optional mounting 202 is provided for additional optical cable clamps. An input power termination 204 is provided adjacent a three pole quick disconnect connector 206. A grounding stud 208 is also provided on the rear panel 28. A bottom end cap 208 of the rear panel 28 may be provided with a conduit entry as an option.

The rear panel 28 may be provided with mounting hardware for mounting the Access Node. Different mounting hardware is provided according to requirements of the installation site. In the illustrated embodiment, the Access Node 10 is to be mounted between the plates of an I-beam or within another enclosed space. A pair of column gripper assemblies 210 is shown in the illustrated example. The column gripper assemblies 210 each include a pair of threaded bolts 212 extending through threaded sleeves 214 in the rear panel 28 and into a turnbuckle 216. Rotation of the turnbuckles 216 in a first direction draws both bolts 212 inward so that the Access Node 10 may be placed in the mounting recess. Rotation of the turnbuckles 216 in an opposite direction moves the bolts 212 outward to press on the interior walls of the mounting recess.

Figure 10:
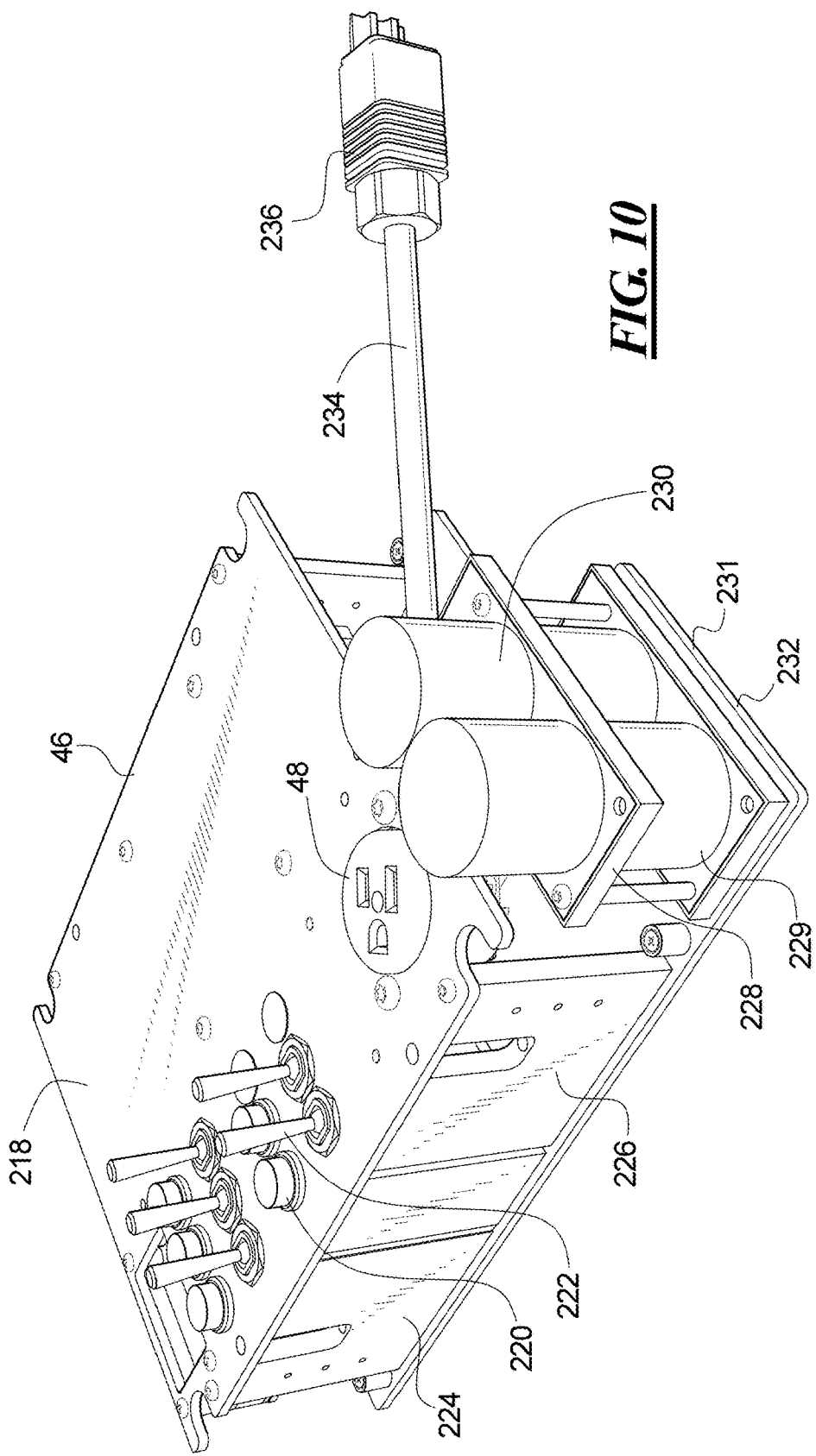
FIG. 10 is a perspective view of a redundant power supply for the Access Node.

FIG. 10 shows the power supply module 46 removed from the Access Node 10. The illustrated power supply 46 is a dual power supply having two 250 watt power supplies connected as a redundant power supply for a total of 500 watts of power. The dual power supply 46 uses two 250 watt rectifiers, two 10 amp circuit breakers, two hold up bus capacitors (HUB), and an active OR circuit with alarm reporting. The power supply module 46 may supply 500 watts of continuous power or the second power supply may be used as a hot standby of the 250 watt power supply being used. The module includes a P12127 Cool-ORing integrated circuit with a high speed ORing MOSFET controller and low on-state resistance MOSFET. The ORing provides extremely low forward voltage drop, which could interfere with load sharing, and very low heat generation. The ORing prevents reverse biasing of individual rectifiers when one or both are off and great potential exists from the battery pack.

The illustrated power supply module 46 includes a front mounting plate 218 on which are provided six indicator lamps 220 and six circuit breaker switches 222 by which a service technician may control power to components of the Access Node. The front plate 218 has the convenience outlet 48 by which service personnel may power test or communications equipment while working on the Access Node 10. Behind the front plate 218 are provided the two power supply rectifiers 224 and 226. Four electrolytic capacitors 228, 229, 230 and 231 are provided adjacent to the front plate 218. The capacitors 288-231 function as hold-up capacitors for filtering any drop outs from the incoming power. In a certain example, the capacitors are 820 mF capacitors and provide no less than 100 milliseconds of hold up under load. The capacitors 228 and 230 are mounted on a rear frame 232 that support the other parts of the dual power supply 46 as a modular unit. An output cable 234 with a connector 236 extends from the dual power supply 46.

Figure 11:
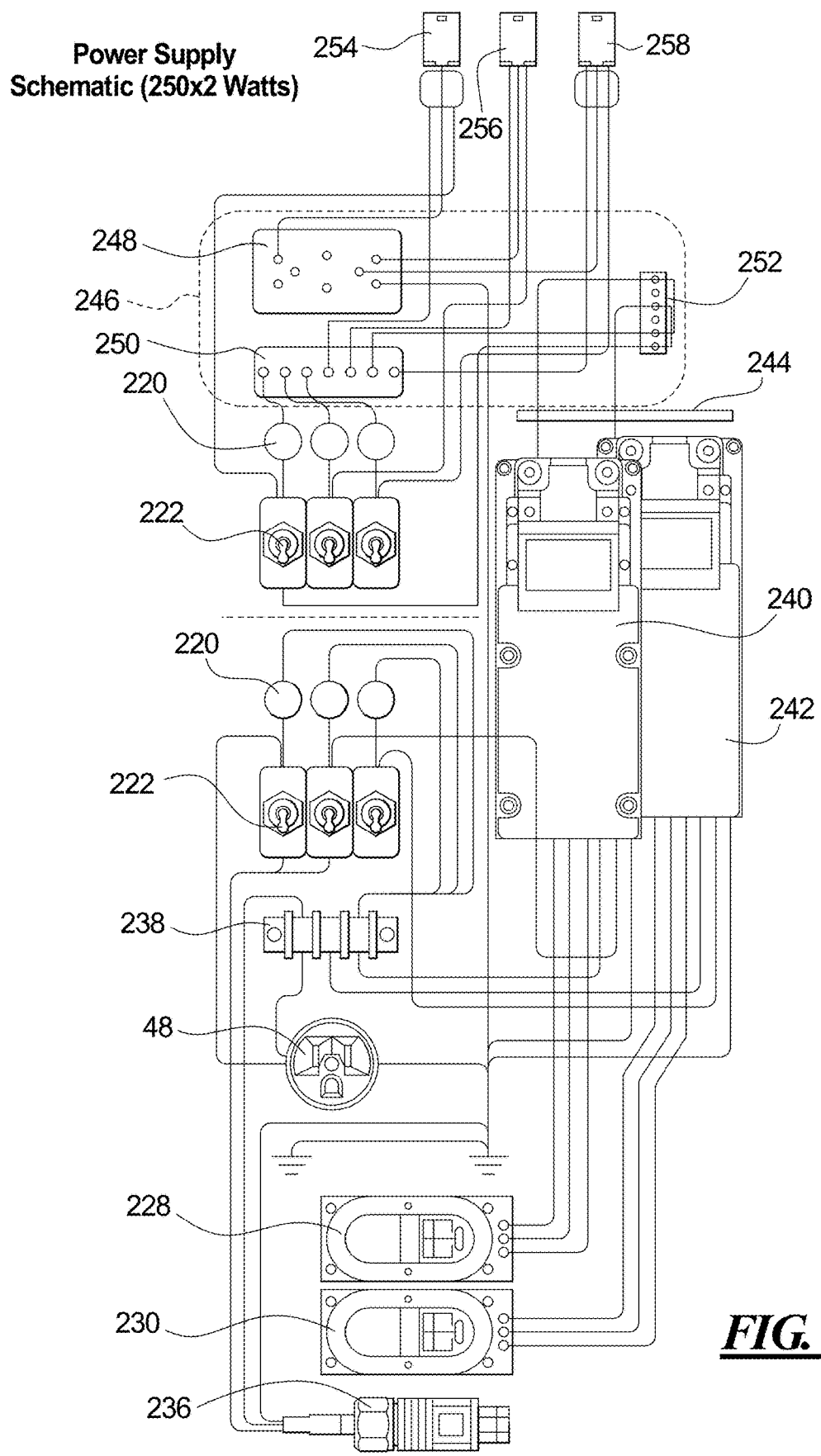
FIG. 11 is a wiring circuit diagram of the redundant power supply.

FIG. 11 shows the dual power supply 46 as functional elements. The connector 236 connects to ground and to a neutral bus 238 and to two of the circuit breaker switches 222. Each circuit breaker switch 222 is provided with an indicator lamp 220. Two rectifiers 240 and 242 are provided, each connected to one of the capacitors 228 and 230, shown here as hold up capacitors. The active ORing function is provided as element 244 connected to both rectifiers 240 and 242. A DC printed circuit board 246 is provided on which is a ground bar 248, a return 250 and a UPS option plug 252. Connectors 254, 256 and 258 are provided for the Ethernet switches, the environmental sensors, and external power, respectively. The switches 222 are connected to control operation of the Ethernet switches or application servers, the EMS device, external power, the utility outlet, the first rectifier and the second rectifier.

Figure 12:
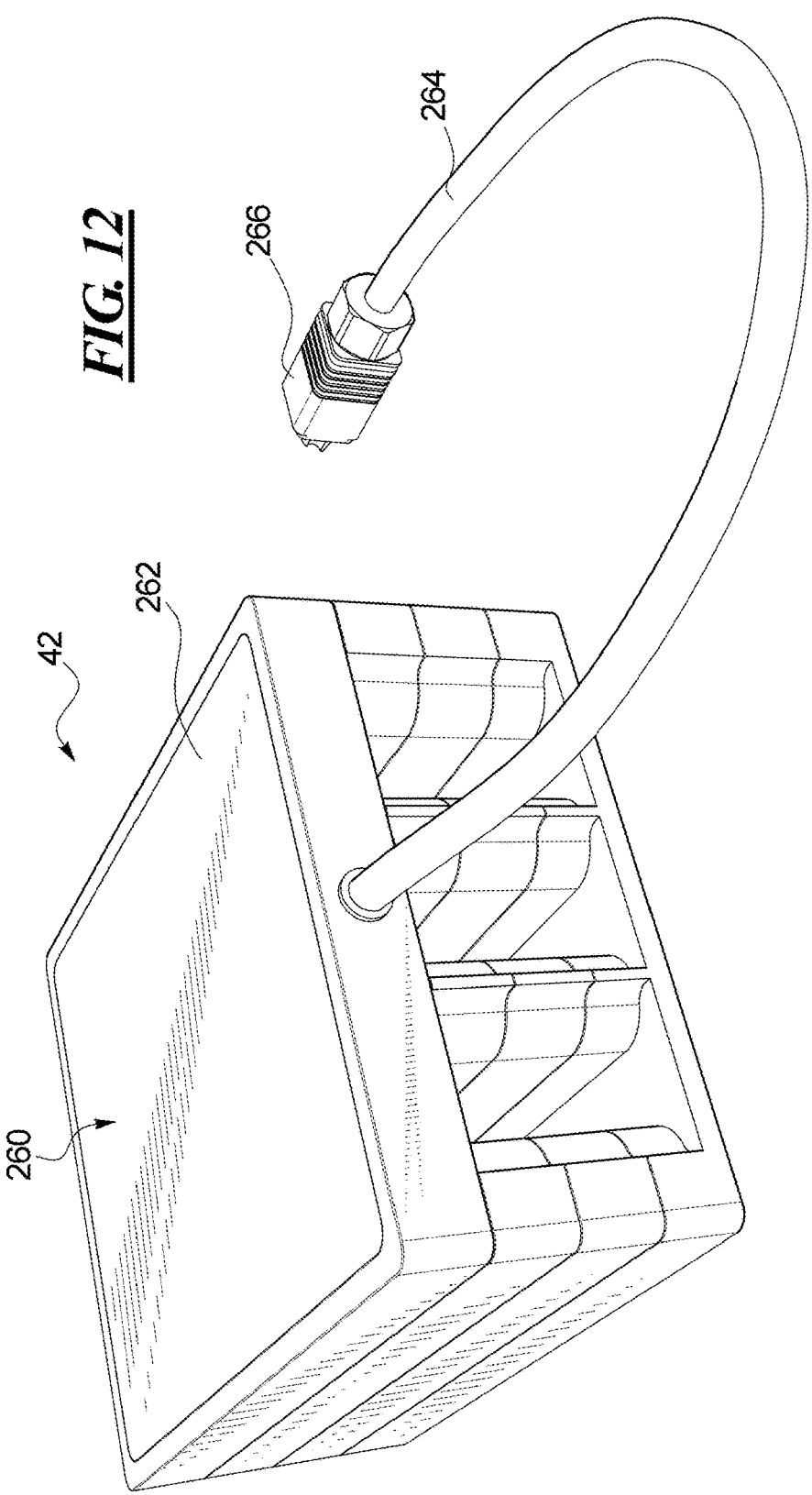
FIG. 12 is a perspective view of a battery backup for the Access Node.

In FIG. 12, the UPS battery back-up module 42 is shown. The module 42 is provided within a housing 260 that is designed to pass cooling air through it and is configured to fit into the Access Node 10. The housing 260 includes a front cover 262 and a cable harness 264 with a four pin battery pack connector 266. The battery back-up module uses battery cells to create a DC voltage when needed. The battery back-up module is of a form factor to fit into the housing and mount to the chassis. The housing 260 is formed of fire retardant ABS. In an example, the battery module 260 provides 48 volts DC of power for several hours. The output voltage is the result of connecting 14 of the cells in series to yield 50.4 volts DC. Two such series connected cells are provided in parallel as parallel battery blocks.

Figure 13:
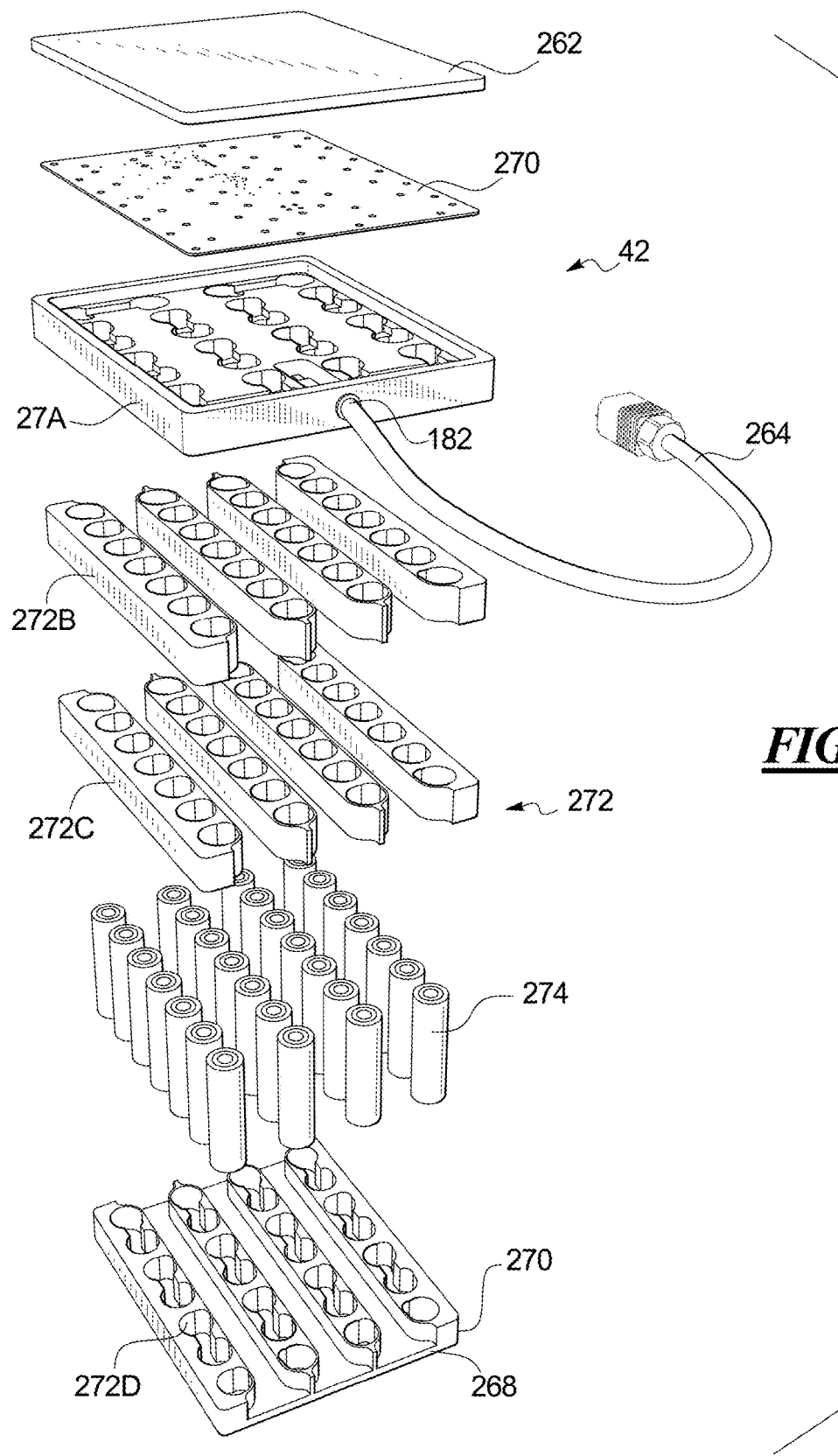
FIG. 13 is an exploded view of the battery backup of FIG. 12.

In FIG. 13 is shown an exploded view of the structure of the battery back-up module 42. It includes a rear cover 268, a rear collector printed circuit board 270, and a battery pack ABS chassis 272 formed of chassis components 272A, B, C, and D provided with through openings to hold battery cells 274 and also designed so that air flows from the top of the unit to the bottom of the unit. Where a solid pack would otherwise restrict air, the continuous flow of air through the pack allows not only individual cell cooling but also cooling for the entire Access Node. The chassis 272 has 28 openings in the example. A PCM printed circuit board 268 is provided at the bottom of the module 42. A front collector printed circuit board 270 and the front cover 262 complete the module 42. The battery cells 274 contact the two circuit boards 268 and 270 to provide power from and to the cells and for monitoring of the battery cells 274. The circuit boards and covers may be secured to the chassis 272 by screws. A strain relief 282 is provided on battery cable harness 264.

Figure 14:
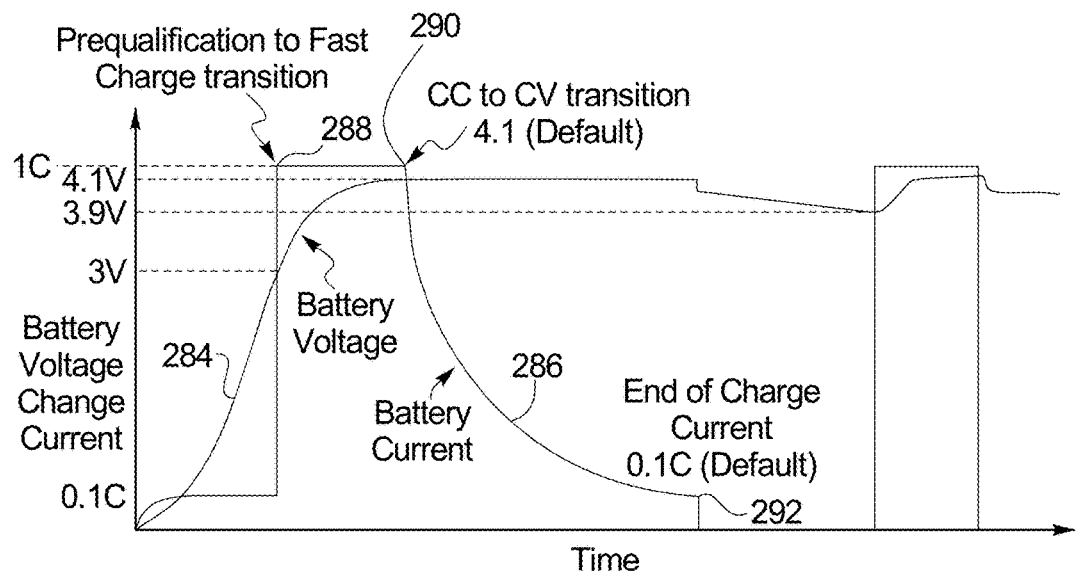
FIG. 14 is a graph showing the charging of the battery backup.

In the graph of FIG. 14, the charging of the battery back-up module 42 is shown. The vertical axis is voltage amplitude and the horizontal axis is time. Lithium ion battery cells in the module are provided with a constant voltage/constant current charging method in which the voltage between the charging terminals is maintained at 4.2 volts per cell. The battery voltage is shown as line 284 and the battery current is shown as line 286. A prequalification to fast charge transition is shown at 288. A charge current to charge voltage transition is made at 4.1 volts at 290. An end of charge current is indicated at 292.

Figure 15:
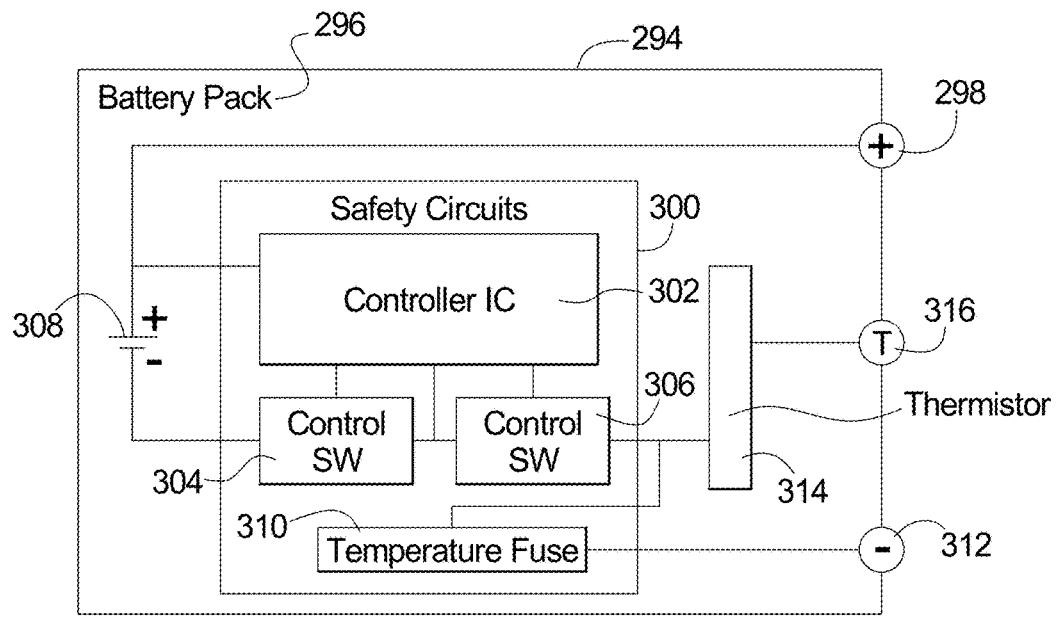
FIG. 15 is a functional block diagram showing a battery pack with safety circuits.

Turning to FIG. 15, a battery pack charging system 294 is shown. The charging system includes the battery pack 296 which has a positive input 298 that connects to a safety circuit block 300 that includes a controller IC 302 that connects to two control switches 304 and 306. The control switch 304 and the controller IC 302 are connected across the batteries 308 to control charging of the batteries. The control switch 306 is connected to a temperature fuse 310 that is in turn connected to the negative input 312. A thermistor 314 is connected between control switch 306 and a T output 316.

The controller IC 302 measures the voltage for each parallel battery block (of 14 cells each). The controller IC 302 shuts off a control switch to either prevent over charging or to prevent over discharging. The voltage of the control switch is measured on both ends of the battery block and the control switches shut off the voltage if it exceeds specifications. The control switches 304 and 306 turn off the charging or discharging depending on the output of the controller IC 302. The temperature fuse 310 cuts off the current if abnormal heating is sensed. The thermistor 314 is provided to measure the battery temperature within the battery packs. The resistance value of the thermistor 314 is measured between the negative terminal 312 and the T terminal 316 by the battery or the charger. The charger controls the charging current until charging is terminated. A noise filter provided at the voltage detectors limits outside noise from resulting in battery malfunction.

The safety circuit 300 stops the charging per cell when the voltage reaches an upper threshold and resumes charging when the voltage falls below a lower threshold. The safety circuit 300 prevents over discharge by halting discharge when the battery voltage falls below a lower discharge threshold and resumes discharge when the battery voltage exceeds an upper discharge threshold. Discharge is also halted if a short occurs across the terminals.

Figure 16:
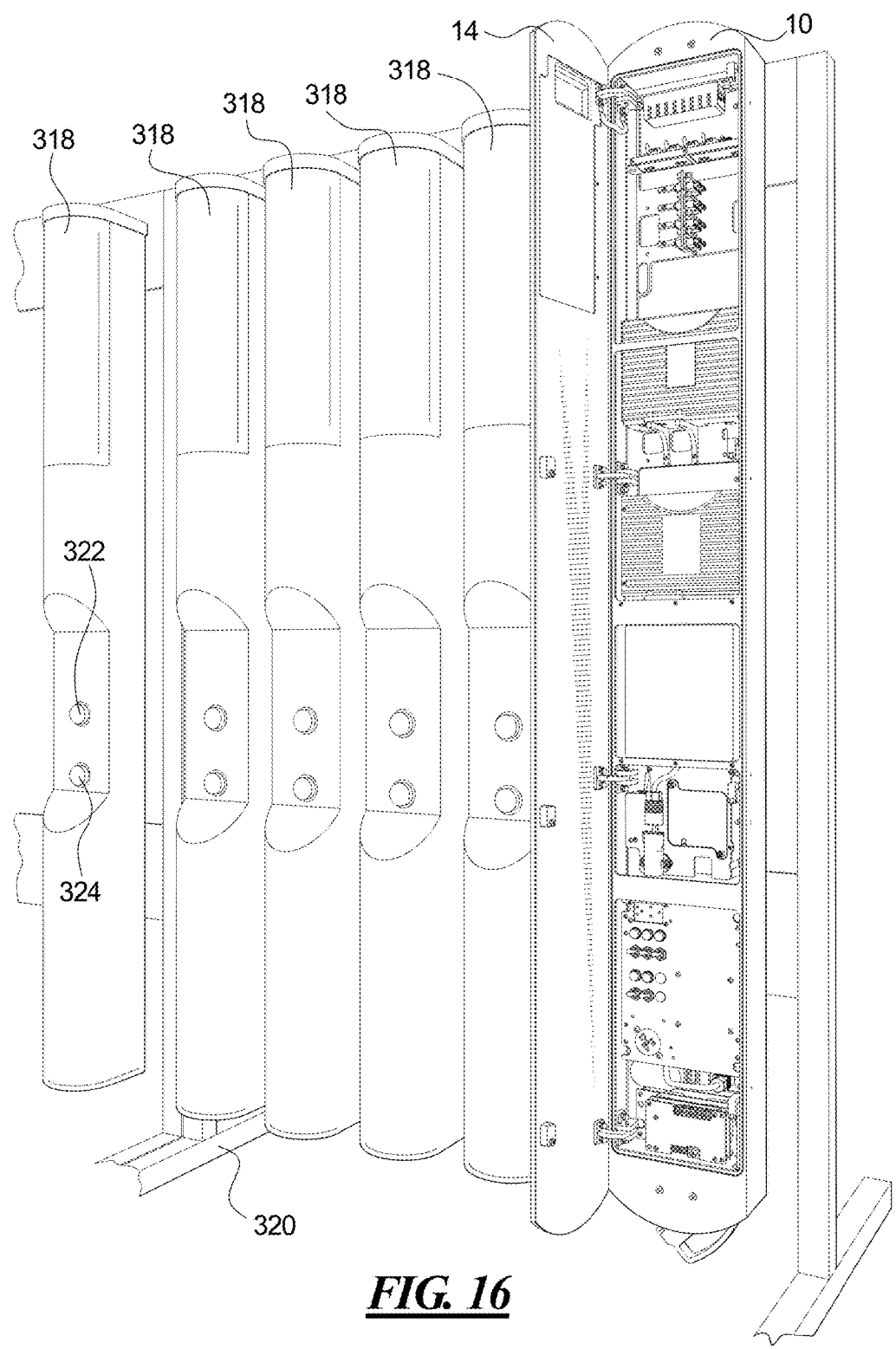
FIG. 16 is a perspective view of an Access Node with a plurality of call stations ready for installation.

FIG. 16 shows an example of the Access Node 10 with the door 14 open and fully equipped to handle multiple call stations. A plurality of call stations 318 are shown adjacent the Access Node 10. The call stations 318 may be connected for communication through the Access Node. The call stations 318 and Access Node 10 are mounted in a rack 320 for handling and delivery to an installation site, such as a subway station. The call stations 318 are mounted at locations throughout the subway station, for example, and are connected to the Access Node 10 which is mounted nearby. A person in the subway station who needs emergency assistance or who wishes to report an emergency situation may press the emergency button 322 on a call station. The emergency information is transferred to the Access Node where vital information such as video can be processed and stored. Then the call and information can be engaged to an emergency call center, for example. If the person only seeks non-emergency information, such as a train schedule or directions, they may press the information button 324 on a call station 318. The information request is communicated through the Access Node 10 to an information center. Two way communications are possible via the call stations 318. Up to 16 call stations may be connected to the Access Node 10 in the illustrated embodiment, although other numbers of possible connections are within the scope of this invention.

Figure 17:
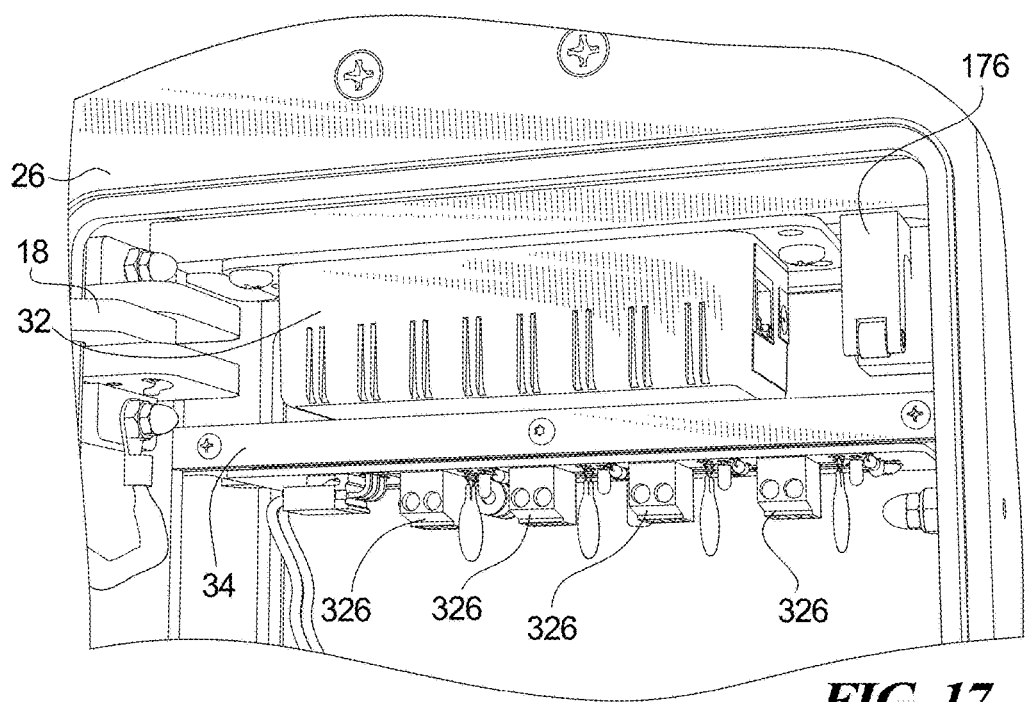
FIG. 17 is a perspective view of an auxiliary DC power distribution module for the Access Node.

FIG. 17 shows the DC power distribution module 34 that is provided in the Access Node 10. The power distribution module 34 may be used to feed external devices with 48 volts of DC power from the Access Node power supply module. Four power ports 326 are provided in the illustrated embodiment. Up to 12 ports may be installed in a daisy chain connection. Each port 326 feeds up to 60 watts of power via a polyfuse distribution. An LED indicator light is provided for each port. A 5 amp circuit breaker and a disconnection switch are provided in the power distribution module 34, along with additional filtering and transient surge suppression circuitry so that clean power is provided to the external devices. Any downstream overloads are indicated, without impacting other ports. The polyfuses reset automatically after the overcurrent returns to a permissible range. Class 2 safety concerns are met and also, any downstream short circuit on any particular branch won't interfere with other devices that remain in operation.

Figure 18:
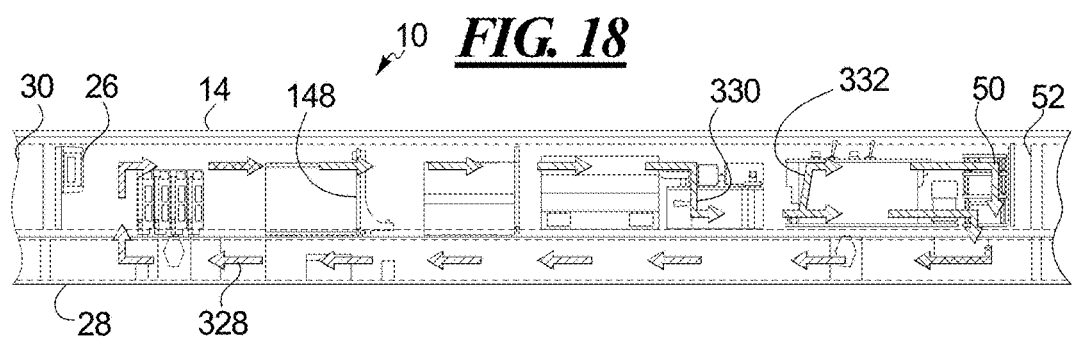
FIG. 18 is a schematic diagram showing a cross section of the Access Node and indicating air flow for cooling.

Thermal management within the enclosed and sealed space of the Access Node 10 is provided. A fan control module 96 operates the fans and monitors any failures as well as provides reporting. The EMS device 88 monitors internal capabilities and external sensor operation. The front chassis 26 houses the electronics and the batteries while the rear panel 28 provides cable management, heat dissipation, wire management and a mounting bracket. The assembled housing 12 provides a cooling tube structure. The cooling tube is shown in FIG. 18. Controlled air circulation within the housing and particularly within the lower portion of the housing 12 mitigates the delta between ambient temperature and internal temperature. Ports and baffles are located strategically within the Access Node 10 to force air flow where it is needed to carry heat up the tube where the air is cooled. High thermal conductivity for the Access Node components and a constant controlled air circulation, as indicated by the arrows 328 in FIG. 18, maintains only a small difference between internal and ambient temperature. In certain embodiments, the Access Node 10 provides approximately 1000 square inches of cooling tube to dissipate heat and equalize temperature to ambient. Heat is picked up by the moving air as it moves from the top 30 of the Access Node 10 over the modules within the chassis 26. A baffle directs air through and behind the perforate wall 148 at 330. The air flow flows to both the front and rear of the perforate wall 148 at 332 until it reaches the fan module 50 near the end 52 of the Access Node 10. The heated air is directed along a path within the rear panel 28 which provides dissipation to the ambient. The air is cooled by the time it reaches the end 30 for a return trip. Cooling is provided without requiring that the Access Node 10 bring in outside air.

The cooling tube is insulated from the front chassis using the Poron gasket between the rear panel 28 and the chassis 26 so that solar and thermal heat loading on the housing has little impact on the cooling capabilities. Mounting brackets that may be used to mount the housing to physical structures such as beams or wall, which further dissipate heat from the rear panel 28. A fan control algorithm is provided to control the fan operation to maximize cooling using the emissivity of the material. A redundant fan system with alarm reporting is provided. A thermistor value is related to stored parameters which controls the speed and therefore the volume of air depending on preprogrammed and stored algorithms.

Figure 19:
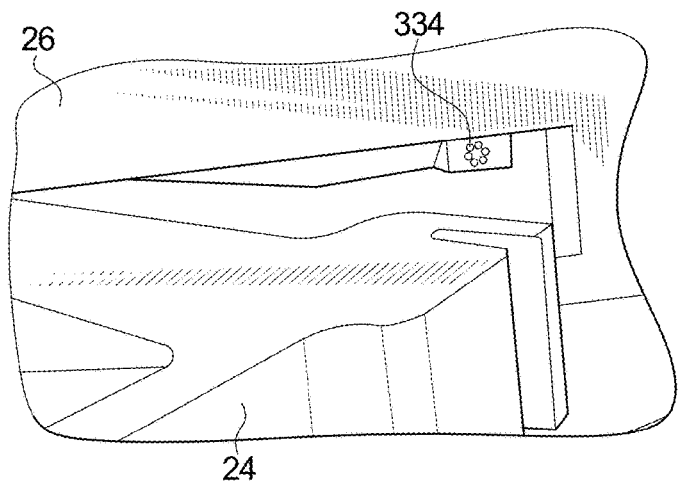
FIG. 19 is a perspective view of a portion of the Access Node showing a vented plug.

Turning to FIG. 19, a vented plug 334 is provided in the Access Node 10 at the latching arm assembly 24. The latching arm 24 is within a protected recess on the bottom of the column shaped Access Node 10. The vented plug provides an air inlet or outlet to the interior space 16 of the housing 12. This prevents pressure build up within the housing and allows air to be released and equalized.

In FIG. 20 is shown an alternative embodiment of the latch hook 336. The latch hook 336 has a block 338 that is mounted to the sliding strip 170 by screws that extend through openings 340 and 342. The opening 340 is generally cylindrical and permits the latch hook 336 to pivot on the pin. The opening 342 is elongated, permitting limited pivoting of the latch hook 336 about the opening 340. A set screw 344 functions as a jack screw to limit pivoting of the latch hook and to fine adjust and tighten the door in the closed position. Openings are provided at the rear of the housing and through the perforate wall 148 to permit tightening of the jack screw 344 with the door 14 in the closed position.

A hook portion 346 extends from the block 338 to form a hook. The hook portion 346 is narrower, or thinner, than the block 338, resulting in a step 348 between the block 338 and the hook 346. A slot 350 is formed in the end of the hook portion 346 and a bore 352 is formed through the clevis formed by the slot 350. A roller bearing 354 is inserted into the slot 350 and a pin 356 holds the roller bearing 354 in place.

Figure 21:
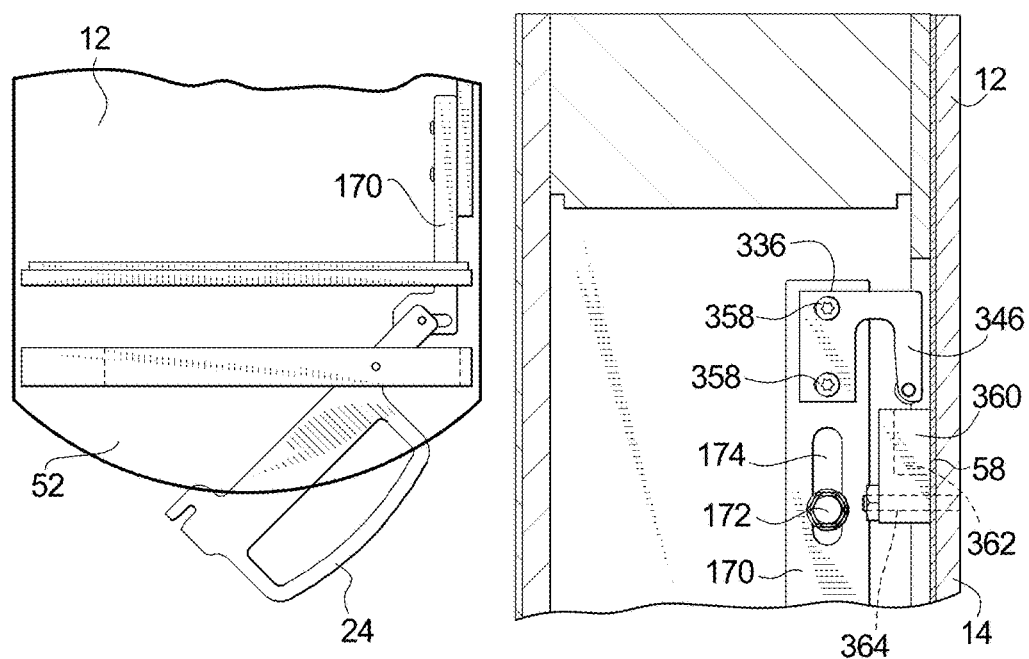
FIG. 21 is a fragmentary cross sectional view showing the latch hook in an unlatched position.
Figure 24A:
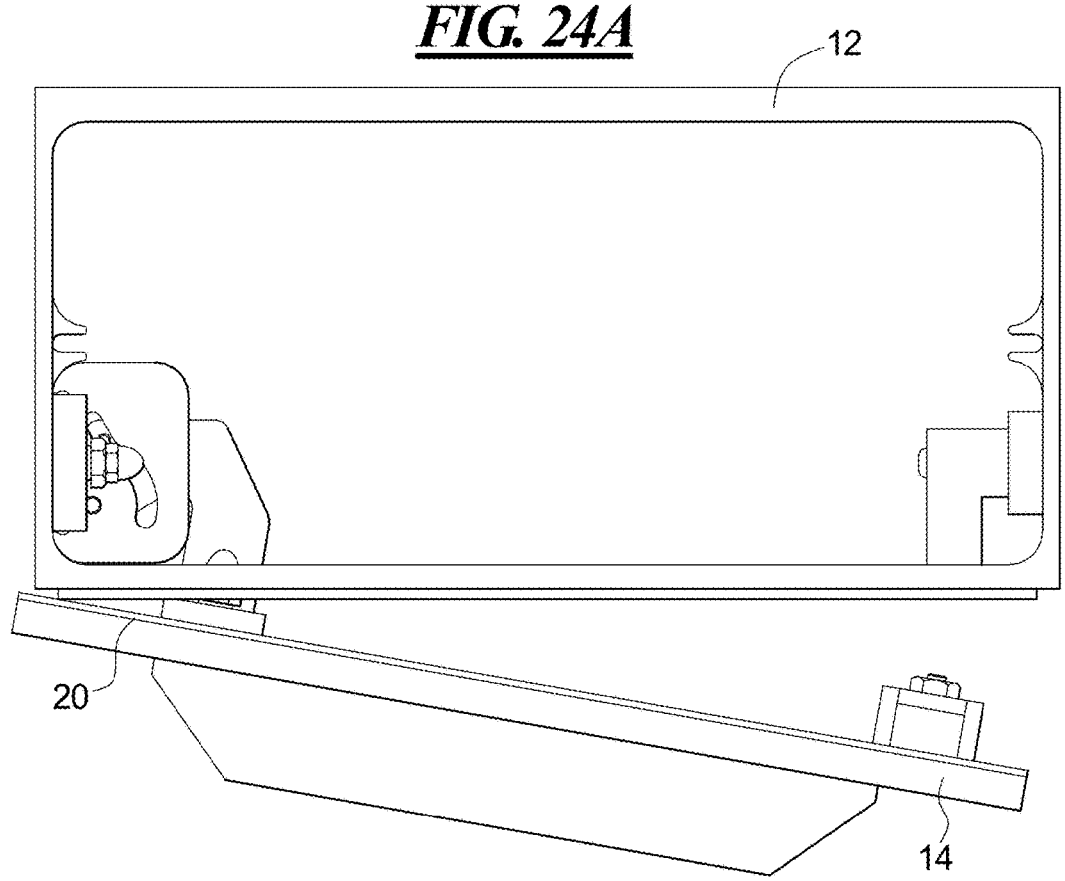
FIG. 24A is a cross-sectional view of the access node showing the door in a first position during opening and closing of door 14 on the housing 12 and FIG. 24E is an enlarged view of the hinge in the first position.
Figure 24E:
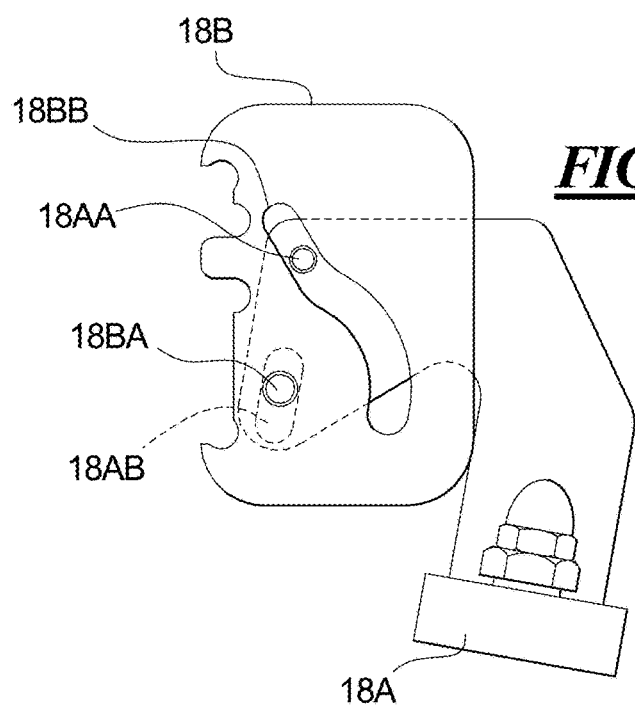
Figure 24B:
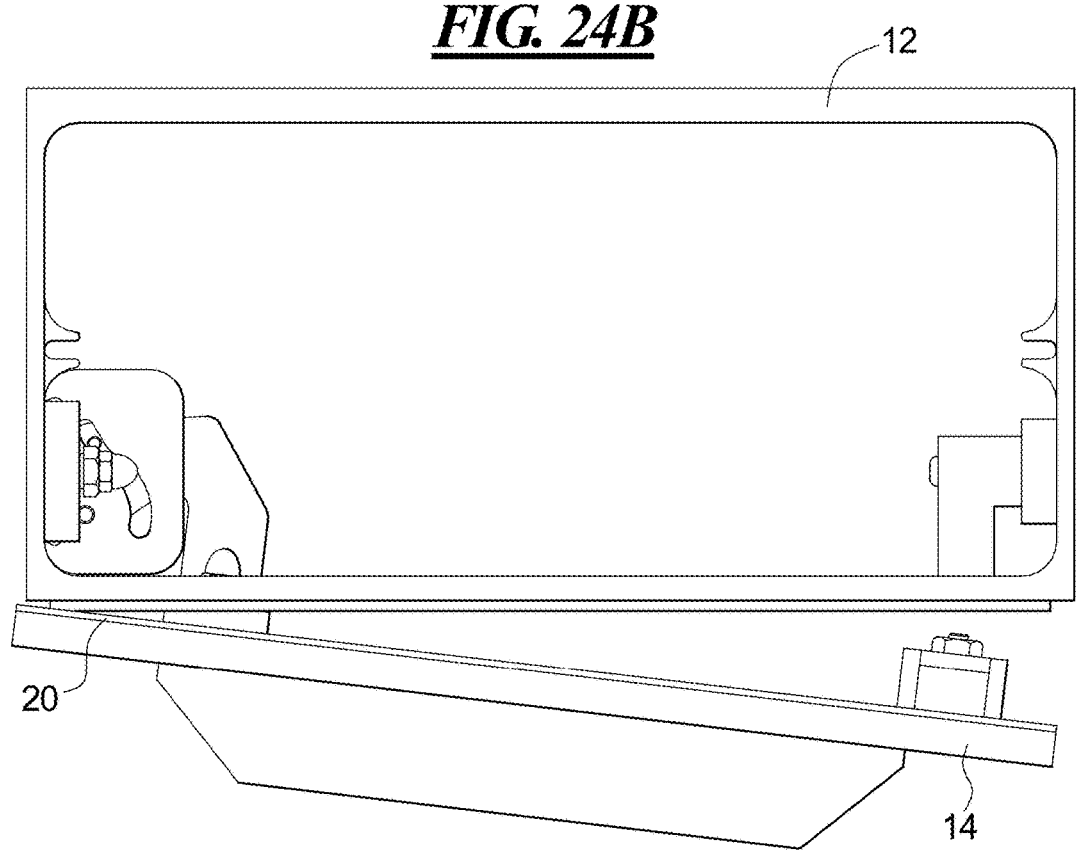
FIG. 24B is a cross-sectional view of the access node showing the door in a second position during opening and closing of door 14 on the housing 12 and FIG. 24F is an enlarged view of the hinge in the second position.
Figure 24F:
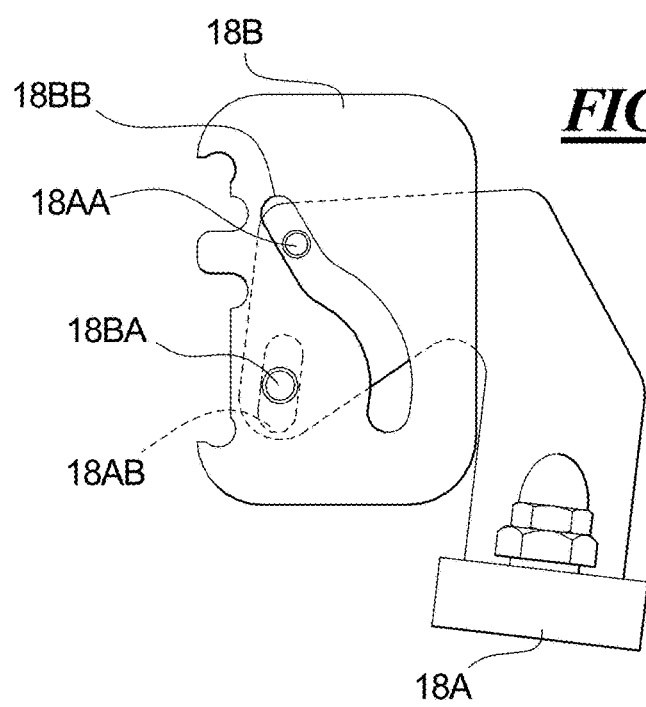
Figure 24C:
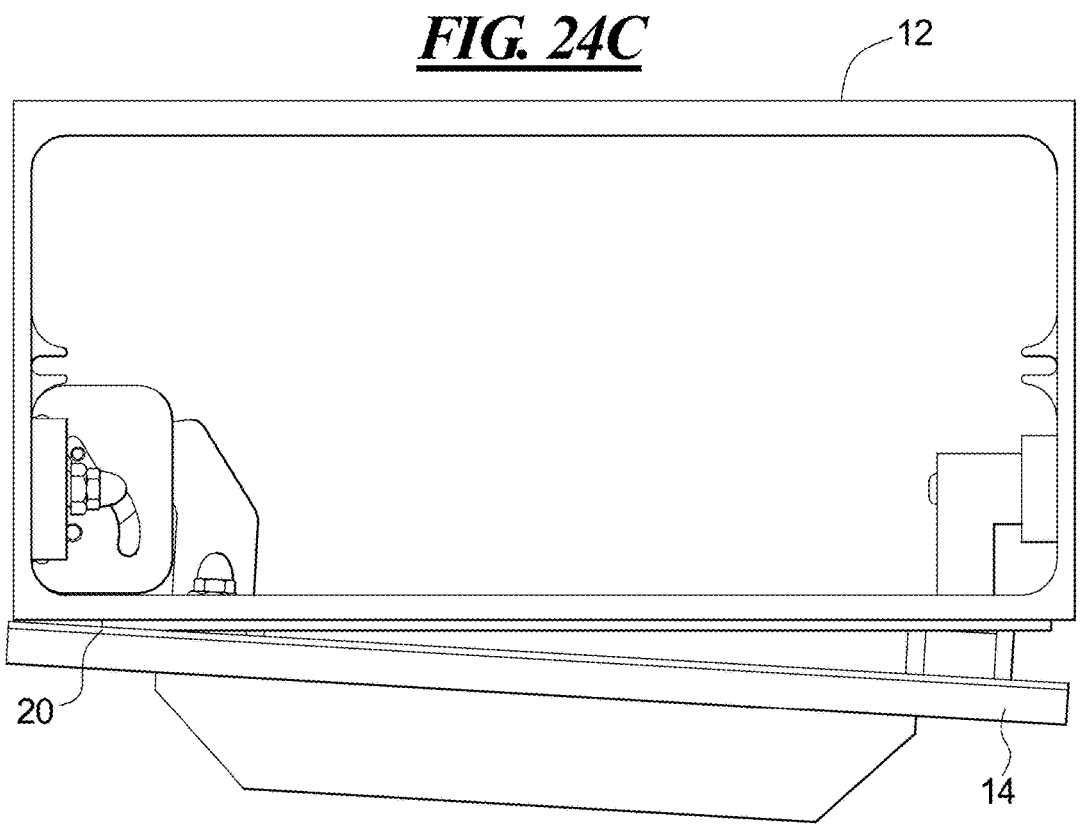
FIG. 24C is a cross-sectional view of the access node showing the door in a third position during opening and closing of door 14 on the housing 12 and FIG. 24G is an enlarged view of the hinge in the third position.
Figure 24G:
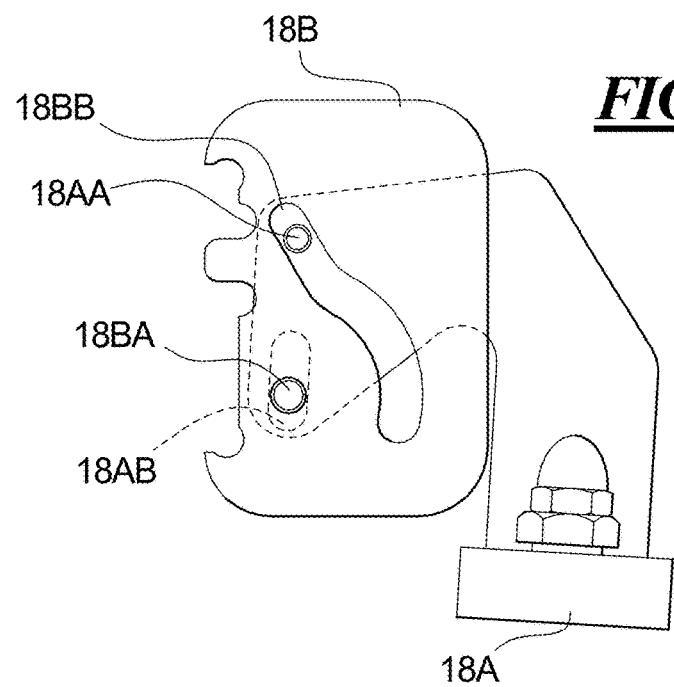

Referring to FIG. 21, as shown in the left side of the figure, the latch handle 24 at the bottom 52 of the housing 12 is in the open position. The latch handle 24 is attached to the sliding strip 170 that extends along an inside of the housing 12. As shows in the right side of the figure, the sliding strip 170 has the slot 174 in which is attached the fastener 172 that permits the sliding strip 170 to move longitudinally of the housing 12. The latch hook 336 is mounted on pins 358 on the sliding strip 170. The latch is open and the hook portion 346 has not yet entered a space 360 that is formed behind a front wall 362 of the pocket 58. The pocket 58 is attached by a fastener 364 to the door 14.

The door latch is partially closed in FIG. 22. In particular, the latch handle 24 has been moved toward the latch position and is shown partially there. The sliding strip 170 moves the latch hook 336 toward the pocket 58 so that the roller bearing 354 rolls along an inside surface of the front wall 362. Friction between the latch hook 336 and the pocket 58 is reduced by the roller bearing 354, resulting in less force being required on the latch handle 24. Note that four latch hooks 336 are being engaged into pockets 58 at the same time. The door 14 is forced against the housing 12 as the latch is engaged.

FIG. 23 shows the door latched fully engaged. The latch handle 24 is in the fully latched position and is recessed within an opening in the bottom end 52 of the housing 12. The handle 24 is hidden from view and protected from damage in this position. A lock, such as an electronic lock keeps the latch handle 24 in the closed position, as noted above. The latch hook 336 is fully engaged into the pocket 58. The hook portion 346 is tapered to bear against the inside surface of the pocket wall 362 in the fully latched position. The latching force is not borne by the roller bearing 354.

FIGS. 24A-24I also shows the door 14 in the opened and closed positions.

Thus, there is shown and described a communication Access Node for call stations that includes a modular housing within which is mounted wire and wireless communication systems and power systems. The housing has a chassis for mounting the electronics and battery modules and a back panel for managing cables and providing heat dissipation. A door to the chassis is secured using latch hooks with roller bearings. Optical cable termination is provided as a two sided patch panel. Dual power supplies provide power to internal components and to external components via a distribution module. Backup power is provided by a custom battery backup with a charging controller. Cooling is controlled by dual fans and a fan controller moving air through the housing using openings and baffles. Freestanding pedestal mounting of the Access Node is an option. Venting through a plug prevents pressure build up.

Although other modifications and changes may be suggested by those skilled in the art, it is the intention of the inventors to embody within the patent warranted herein all changes and modifications as reasonably and properly come within the scope of their contribution to the art.

I claim:

1. An access node for a communication system, comprising:
   a housing having:
      a chassis configured for mounting electronic modules; and
      a door mounted on the chassis by a hinge for movement between an open position and a closed position;
   the door defining a plurality of pockets;
   a sliding strip mounted in the chassis and operable to move in a sliding motion between a first sliding strip position and a second sliding strip position;
   a plurality of latch hooks mounted on the sliding strip; the latch hooks each including a hook portion shaped to engage into respective ones of the plurality of pockets when the door is in the closed position and the sliding strip is moved to the second sliding strip position; and
   a roller bearing mounted on the hook portion of each of the plurality of latch hooks, the roller bearing engaging a respective one of the pockets when the door is in the closed position and the sliding strip is being moved toward the second sliding strip position.

2. An access node as claimed in claim 1, further comprising:
   an adjustable mounting between the sliding strip and the latch hooks; and
   at least one set screw in each of the latch hooks, the set screw being operable to secure the adjustable mounting in an adjusted position.

3. An access node as claimed in claim 2, wherein the adjustable mounting includes two parallel studs extending from the sliding strip into openings in each of the latch hooks; and
   wherein the at least one set screw includes two set screws threadably engaged in the latch hook for threaded movement in a direction perpendicular to the two parallel stud, the two set screws being configured for selective engagement with respective ones of the two parallel studs.

4. An access node as claimed in claim 3, wherein the two parallel studs are parallel to a plane of the door when the door is in the closed position.

5. An access node as claimed in claim 1, wherein the pockets include latch pocket portions extending from an inside surface of the door into an interior of the chassis.

6. An access node as claimed in claim 5, wherein the latch pocket portions are set into milled boundary on the door and are mounted to the door by jacking setscrews and screws.

7. An access node as claimed in claim 1, further comprising:
   a handle mounted to the chassis and operatively connected to the sliding strip, the handle being configured for movement between a first handle position and a second handle position, the first handle position disengaging the latch hooks from the pockets on the door to release the door for movement to the open position, the second handle position engaging the latch hooks into the pockets on the door when the door is in the closed position.

8. An access node as claimed in claim 7, wherein the handle is in a hidden position in the housing when in the second handle position.

9. An access node as claimed in claim 8, wherein the door includes a downwardly extending portion projecting below a bottom of the chassis when the door is in the closed position, the handle being disposed behind the downwardly extending portion of the door when in the second handle position, the handle being hidden behind the downwardly extending position.

10. An access node as claimed in claim 7, wherein the handle is mounted for pivoting movement between the first handle position and the second handle position, the handle being configured for translating the pivoting movement of the handle into sliding movement of the sliding strip.

11. An access node as claimed in claim 7, wherein the handle includes a hook portion extending into an interior of the chassis when the handle is in the second handle position.

12. An access node as claimed in claim 1, further comprising:
   a gasket between the chassis and the door, the gasket being configured to seal between the chassis and the door when the door is in the closed position and the latch hooks are engaged in the pockets.

13. An access node as claimed in claim 1, wherein the chassis and the door are of an elongated shape having first and second opposite elongated sides, and further comprising:
   a plurality of hinges along the first elongated side of the chassis and the door;
   wherein the latch hooks and the pockets are along the second elongated side of the chassis and the door.

14. An access node as claimed in claim 13, wherein the chassis and the door form a column shaped housing enclosing electronic and communication equipment for communication with a plurality of call stations.

15. An access node as claimed in claim 13, wherein the chassis and the door are configured to enclose the hinges entirely within the housing when the door is in the closed position.

16. An access node as claimed in claim 1, wherein the roller bearings of the latch hooks are configured to roll along an interior surface of the pockets during sliding movement of the sliding strip when the door is in the closed position.

* * * * *